US012123268B2

United States Patent
Ross et al.

(10) Patent No.: US 12,123,268 B2
(45) Date of Patent: *Oct. 22, 2024

(54) GAS TIGHT SHALE SHAKER FOR ENHANCED DRILLING FLUID RECOVERY AND DRILLED SOLIDS WASHING

(71) Applicant: RECOVER ENERGY SERVICES INC., Calgary (CA)

(72) Inventors: Stan Ross, Cochrane (CA); Wendell Palmer, Cochrane (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 15 days.

This patent is subject to a terminal disclaimer.

(21) Appl. No.: 17/385,614

(22) Filed: Jul. 26, 2021

(65) Prior Publication Data

US 2021/0355770 A1 Nov. 18, 2021

Related U.S. Application Data

(62) Division of application No. 15/447,971, filed on Mar. 2, 2017, now Pat. No. 11,111,743.

(Continued)

(51) Int. Cl.
*E21B 21/06* (2006.01)
*B01D 33/03* (2006.01)
(Continued)

(52) U.S. Cl.
CPC ........ *E21B 21/065* (2013.01); *B01D 33/0346* (2013.01); *B01D 33/41* (2013.01);
(Continued)

(58) Field of Classification Search
None
See application file for complete search history.

(56) References Cited

U.S. PATENT DOCUMENTS

| 1,774,044 | A |   | 8/1930 | Sweetland |
| 2,089,548 | A | * | 8/1937 | Frantz ............... B01D 35/20 209/268 |

(Continued)

FOREIGN PATENT DOCUMENTS

| CA | 2741955 | 5/2010 |
| CA | 2712774 | 11/2010 |

(Continued)

OTHER PUBLICATIONS

Canadian Office Action issued in CA 2,997,176, dated Apr. 21, 2022.

(Continued)

*Primary Examiner* — Robert J Popovics
(74) *Attorney, Agent, or Firm* — Greenblum & Bernstein, P.L.C.

(57) ABSTRACT

A gas tight shale shaker for enhanced drilling fluid recovery and drilled solids washing. A process and apparatus for liquid phase-solid phase separation of oil base drilling mud-containing drill cuttings is described including flowing the drilling mud-containing drill cuttings over a vibrating screen bed to cause a least a portion of the drilling mud to pass through the screen bed and the drill cuttings to remain on the screen bed. A diluent is added to the oil base drilling mud containing drill cuttings prior to flowing the drilling mud containing drill cutting over the screen bed. The entire process is performed in a gas-tight environment preventing escape of diluent from the process into the external atmosphere and preventing introduction of gases into the process from the external atmosphere.

10 Claims, 8 Drawing Sheets

Related U.S. Application Data

(60) Provisional application No. 62/303,169, filed on Mar. 3, 2016.

(51) Int. Cl.
*B01D 33/41* (2006.01)
*B01D 33/76* (2006.01)
*B01D 33/80* (2006.01)
*E21B 21/01* (2006.01)

(52) U.S. Cl.
CPC ............. *B01D 33/76* (2013.01); *B01D 33/80* (2013.01); *E21B 21/01* (2013.01)

(56) References Cited

U.S. PATENT DOCUMENTS

| | | | | |
|---|---|---|---|---|
| 2,183,896 | A * | 12/1939 | Rupp | B01D 35/20 210/384 |
| 2,246,483 | A * | 6/1941 | Dillon | B07B 1/284 74/61 |
| 2,312,477 | A | 3/1943 | Pollitz | |
| 2,329,333 | A | 9/1943 | Carter | |
| 2,462,878 | A | 3/1949 | Logue | |
| 2,683,533 | A | 7/1954 | Paul | |
| 2,736,434 | A * | 2/1956 | Yacoe | C10B 53/02 34/399 |
| 3,228,592 | A | 1/1966 | Shapiro | |
| 3,452,868 | A | 7/1969 | Miller | |
| 3,497,063 | A | 2/1970 | Hirs | |
| 3,559,807 | A * | 2/1971 | Reilly | B01D 33/04 210/387 |
| 3,570,670 | A | 3/1971 | Endo | |
| 3,616,904 | A | 11/1971 | Aremaa | |
| 3,662,886 | A | 5/1972 | Kennedy, Jr. | |
| 3,766,997 | A * | 10/1973 | Heilhecker | E21B 21/065 175/66 |
| 3,773,661 | A | 11/1973 | Talley | |
| 3,777,405 | A | 12/1973 | Crawford | |
| 3,796,317 | A | 3/1974 | Lippert | |
| 3,852,197 | A * | 12/1974 | Thompson | B03B 7/00 210/389 |
| 3,899,426 | A * | 8/1975 | Hirs | B01D 29/096 210/387 |
| 3,929,642 | A | 12/1975 | Ennis | |
| 3,970,552 | A | 7/1976 | Bongert | |
| 4,033,873 | A | 7/1977 | Stoltenberg | |
| 4,043,047 | A * | 8/1977 | Galliker | C02F 11/131 204/155 |
| 4,116,288 | A | 9/1978 | Love | |
| 4,120,447 | A | 10/1978 | Jäger | |
| 4,147,635 | A | 4/1979 | Crowe | |
| 4,192,743 | A | 3/1980 | Bastgen | |
| 4,209,381 | A | 6/1980 | Kelly, Jr. | |
| 4,234,416 | A | 11/1980 | Lower | |
| 4,247,312 | A | 1/1981 | Thakur | |
| 4,306,974 | A | 12/1981 | Harry | |
| 4,350,591 | A | 9/1982 | Lee | |
| 4,397,659 | A | 8/1983 | Gowan | |
| 4,402,834 | A | 9/1983 | Bastgen | |
| 4,430,231 | A | 2/1984 | Bratten | |
| 4,446,022 | A | 5/1984 | Harry | |
| 4,457,839 | A | 7/1984 | Bailey | |
| 4,459,207 | A | 7/1984 | Young | |
| 4,477,358 | A | 10/1984 | Heintges | |
| 4,482,459 | A | 11/1984 | Shiver | |
| 4,495,065 | A | 1/1985 | DeReamer | |
| 4,567,673 | A * | 2/1986 | Bohnensieker | F26B 13/183 118/259 |
| 4,568,460 | A * | 2/1986 | Bratten | B01D 29/822 210/387 |
| 4,576,713 | A | 3/1986 | Melin | |
| 4,634,535 | A | 1/1987 | Lott | |
| 4,636,308 | A | 1/1987 | Summers | |
| 4,639,258 | A | 1/1987 | Schellstede | |
| 4,664,813 | A * | 5/1987 | Schneider | B30B 9/02 210/387 |
| 4,666,471 | A * | 5/1987 | Cates | B01D 19/0068 210/801 |
| 4,722,793 | A | 2/1988 | Seifert | |
| 4,747,961 | A | 5/1988 | Beer | |
| 4,750,920 | A | 6/1988 | Manuel | |
| 4,756,092 | A | 7/1988 | Anderson | |
| 4,802,591 | A | 2/1989 | Lower | |
| 4,827,853 | A | 5/1989 | Emery | |
| 4,882,054 | A * | 11/1989 | Derrick | B01D 33/802 210/405 |
| 4,886,608 | A * | 12/1989 | Cook | B01D 33/0376 210/791 |
| 4,911,834 | A | 3/1990 | Murphy | |
| 4,921,608 | A | 5/1990 | Lee | |
| 4,944,873 | A | 7/1990 | Williams | |
| 4,956,088 | A * | 9/1990 | Hindstrom | B01D 33/46 210/406 |
| 4,962,592 | A | 10/1990 | Orizand | |
| 5,091,079 | A | 2/1992 | Gayman | |
| 5,093,001 | A * | 3/1992 | Ueda | B01D 33/66 210/403 |
| 5,098,586 | A * | 3/1992 | Rudolph | B29B 9/065 210/780 |
| 5,156,749 | A | 10/1992 | Williams | |
| 5,173,272 | A | 12/1992 | Roland | |
| 5,183,086 | A | 2/1993 | Fanta | |
| 5,190,645 | A | 3/1993 | Burgess | |
| 5,209,841 | A * | 5/1993 | Bratten | B01D 25/1275 210/387 |
| 5,232,099 | A * | 8/1993 | Maynard | B07B 1/42 209/276 |
| 5,233,763 | A | 8/1993 | Minnie, Jr. | |
| 5,246,574 | A | 9/1993 | Jorgens | |
| 5,256,290 | A | 10/1993 | Becker | |
| 5,308,487 | A * | 5/1994 | Thissen | B01D 33/04 209/477 |
| 5,341,939 | A | 8/1994 | Aitchison | |
| 5,344,570 | A | 9/1994 | McLachlan | |
| 5,357,881 | A | 10/1994 | Elcik | |
| 5,366,626 | A | 11/1994 | Pierson | |
| 5,382,327 | A | 1/1995 | Seifert | |
| 5,392,925 | A * | 2/1995 | Seyffert | B07B 1/4663 209/403 |
| 5,454,957 | A | 10/1995 | Roff, Jr. | |
| 5,462,673 | A * | 10/1995 | Piers | B01D 33/0376 210/791 |
| 5,462,677 | A | 10/1995 | Benesi | |
| 5,470,473 | A * | 11/1995 | Park | B01D 33/60 210/402 |
| 5,482,594 | A | 1/1996 | Salminen | |
| 5,507,858 | A | 4/1996 | Jepson | |
| 5,527,458 | A | 6/1996 | Gehrmann | |
| 5,540,846 | A | 7/1996 | Koch | |
| 5,570,749 | A | 11/1996 | Reed | |
| 5,582,271 | A | 12/1996 | Mielo | |
| 5,582,727 | A | 12/1996 | Foster | |
| 5,593,582 | A | 1/1997 | Roff, Jr. | |
| 5,603,846 | A | 2/1997 | Uchiyama | |
| 5,614,094 | A | 3/1997 | Deister | |
| 5,641,070 | A | 6/1997 | Seyffert | |
| 5,643,468 | A * | 7/1997 | Ure | B01D 33/04 210/406 |
| 5,656,179 | A | 8/1997 | Gehrmann | |
| 5,707,512 | A | 1/1998 | Koch | |
| 5,707,535 | A | 1/1998 | Harris | |
| 5,804,081 | A | 9/1998 | DeGesero | |
| 5,813,138 | A * | 9/1998 | Barabe | F26B 17/04 34/208 |
| 5,814,230 | A | 9/1998 | Willis | |
| 5,840,187 | A | 11/1998 | Derenthal | |
| 5,853,583 | A | 12/1998 | Shah | |
| 5,862,612 | A | 1/1999 | Bielfeldt | |
| 5,919,358 | A | 7/1999 | Williams | |
| 5,996,484 | A | 12/1999 | Reddoch | |
| 6,004,461 | A | 12/1999 | Harris | |
| 6,073,709 | A | 6/2000 | Hensley | |

(56) References Cited

U.S. PATENT DOCUMENTS

| | | | |
|---|---|---|---|
| 6,106,733 A | 8/2000 | Wood | |
| 6,110,367 A | 8/2000 | Jensen | |
| 6,155,428 A | 12/2000 | Bailey | |
| 6,193,070 B1 | 2/2001 | Rowney | |
| 6,213,227 B1 | 4/2001 | Dietzen | |
| 6,237,780 B1 | 5/2001 | Schulte | |
| 6,279,471 B1 | 8/2001 | Reddoch | |
| 6,315,813 B1 | 11/2001 | Morgan | |
| 6,321,860 B1 | 11/2001 | Reddoch | |
| 6,322,693 B1 | 11/2001 | Southall | |
| 6,352,159 B1 | 3/2002 | Loshe | |
| 6,371,301 B1 | 4/2002 | Schulte | |
| 6,371,306 B2 | 4/2002 | Adams | |
| 6,409,929 B2 | 6/2002 | Bott | |
| 6,412,644 B1 | 7/2002 | Crabbe | |
| 6,413,297 B1 | 7/2002 | Morgan | |
| 6,432,299 B1 | 8/2002 | Hensley | |
| 6,461,523 B1 | 10/2002 | Greenrose | |
| 6,506,310 B2 | 1/2003 | Kulbeth | |
| 6,510,947 B1 | 1/2003 | Schulte | |
| 6,530,438 B1 | 3/2003 | McIntyre | |
| 6,530,482 B1 | 3/2003 | Wiseman | |
| 6,533,946 B2* | 3/2003 | Pullman | B01D 21/26 |
| | | | 210/201 |
| 6,550,552 B1 | 4/2003 | Pappa et al. | |
| 6,620,221 B1 | 9/2003 | Lenzing | |
| 6,622,870 B1* | 9/2003 | Prinssen | B01D 33/04 |
| | | | 210/406 |
| 6,679,385 B2 | 1/2004 | Suter | |
| 6,681,874 B2 | 1/2004 | Risher | |
| 6,711,830 B2 | 3/2004 | Hensley | |
| 6,715,611 B2 | 4/2004 | Crabbe | |
| 6,769,550 B2* | 8/2004 | Adams | B01D 29/07 |
| | | | 209/403 |
| 6,797,185 B2 | 9/2004 | Lisa | |
| 6,808,626 B2 | 10/2004 | Kulbeth | |
| 6,823,238 B1 | 11/2004 | Hensley | |
| 6,846,421 B2 | 1/2005 | Bratten | |
| 6,848,583 B2 | 2/2005 | Largent | |
| 6,855,261 B2 | 2/2005 | Boutte | |
| 6,863,183 B2 | 3/2005 | Schulte | |
| 6,868,972 B2 | 3/2005 | Seyffert | |
| 6,892,887 B2 | 5/2005 | Rayborn | |
| 6,932,169 B2 | 8/2005 | Wylie | |
| 6,953,097 B2 | 10/2005 | Seyffert | |
| 7,028,414 B2* | 4/2006 | Vonplon | F26B 21/04 |
| | | | 34/399 |
| 7,029,579 B2* | 4/2006 | Tapp | B01D 29/82 |
| | | | 210/387 |
| 7,040,488 B2* | 5/2006 | Seyffert | B01D 33/0376 |
| | | | 209/269 |
| 7,093,678 B2 | 8/2006 | Risher | |
| 7,111,739 B2 | 9/2006 | Tsutsumi | |
| 7,175,027 B2* | 2/2007 | Strong | B07B 1/48 |
| | | | 209/412 |
| 7,195,084 B2 | 3/2007 | Burnett | |
| 7,198,156 B2 | 4/2007 | Schulte | |
| 7,216,767 B2 | 5/2007 | Schulte | |
| 7,243,741 B2 | 7/2007 | Swartout | |
| 7,278,540 B2 | 10/2007 | Stone | |
| 7,306,057 B2 | 12/2007 | Strong | |
| 7,331,469 B2 | 2/2008 | Padalino | |
| 7,380,673 B2 | 6/2008 | Fout | |
| 7,381,329 B1* | 6/2008 | Moss | B01D 33/41 |
| | | | 100/126 |
| 7,514,011 B2 | 4/2009 | Kulbeth | |
| 7,568,535 B2 | 8/2009 | Larson | |
| 7,571,817 B2 | 8/2009 | Scott | |
| 7,575,073 B2 | 8/2009 | Swartout | |
| 7,575,657 B2 | 8/2009 | Lampinen | |
| 7,581,647 B2 | 9/2009 | Grichar | |
| 7,651,619 B2 | 1/2010 | Hansen | |
| 7,703,612 B2 | 4/2010 | Browne | |
| 7,753,214 B2 | 7/2010 | Tomlinson | |
| 7,815,808 B2 | 10/2010 | Benesi | |
| 7,874,082 B2* | 1/2011 | Saarela | F26B 23/001 |
| | | | 34/236 |
| 7,896,162 B2 | 3/2011 | Bailey | |
| 7,980,392 B2* | 7/2011 | Larson | B07B 1/4672 |
| | | | 209/393 |
| 8,025,152 B2* | 9/2011 | Vasshus | B07B 1/55 |
| | | | 209/326 |
| 8,113,356 B2 | 2/2012 | Burnett | |
| 8,118,172 B2 | 2/2012 | Burnett | |
| 8,123,046 B2 | 2/2012 | Billeaud | |
| 8,132,632 B2 | 3/2012 | Scott | |
| 8,201,693 B2 | 6/2012 | Jan | |
| 8,231,010 B2* | 7/2012 | Scott | E21B 21/065 |
| | | | 209/397 |
| 8,282,838 B2 | 10/2012 | Billeaud | |
| 8,287,441 B2 | 10/2012 | Wick | |
| 8,302,780 B1* | 11/2012 | Mitchell | B01D 33/41 |
| | | | 210/791 |
| 8,313,077 B2* | 11/2012 | Rose | B07B 13/18 |
| | | | 248/644 |
| 8,316,557 B2 | 11/2012 | Burnett | |
| 8,394,270 B2* | 3/2013 | Vasshus | B07B 15/00 |
| | | | 55/467 |
| 8,418,856 B2 | 4/2013 | Bailey | |
| 8,453,844 B2 | 6/2013 | Bailey | |
| 8,533,974 B2 | 9/2013 | Burnett | |
| 8,556,083 B2 | 10/2013 | Burnett | |
| 8,561,805 B2 | 10/2013 | Scott | |
| 8,562,816 B1 | 10/2013 | Paille, Jr. | |
| 8,613,360 B2 | 12/2013 | Carr | |
| 8,622,220 B2* | 1/2014 | Schulte, Jr. | E21B 21/065 |
| | | | 209/400 |
| 8,641,811 B2* | 2/2014 | Mathena | E21B 21/067 |
| | | | 96/155 |
| 8,668,634 B2 | 3/2014 | Wick | |
| 8,695,809 B2 | 4/2014 | Sherwood | |
| 8,746,459 B2 | 6/2014 | Scott | |
| 8,746,460 B2* | 6/2014 | Vasshus | E21B 21/065 |
| | | | 210/384 |
| 8,807,343 B2 | 8/2014 | Bailey | |
| 8,812,236 B1* | 8/2014 | Freeman | E21B 21/065 |
| | | | 73/152.43 |
| 8,820,438 B2 | 9/2014 | Ross et al. | |
| 8,844,650 B2 | 9/2014 | Saiz | |
| 8,869,986 B2 | 10/2014 | Bailey | |
| 8,956,543 B2* | 2/2015 | Carr | B07B 1/04 |
| | | | 210/260 |
| 8,984,763 B2* | 3/2015 | Savarese | F26B 3/28 |
| | | | 34/446 |
| 9,004,288 B2 | 4/2015 | Carr | |
| 9,015,959 B2 | 4/2015 | Pomerleau | |
| 9,023,275 B2 | 5/2015 | McClung, III | |
| 9,068,777 B2* | 6/2015 | Savarese | F26B 17/04 |
| 9,073,104 B2 | 7/2015 | Burnett | |
| 9,074,440 B2 | 7/2015 | Carr | |
| 9,079,188 B2* | 7/2015 | Culver | E21B 21/01 |
| 9,079,222 B2 | 7/2015 | Burnett | |
| 9,114,340 B2* | 8/2015 | Smith | B01D 33/04 |
| 9,199,278 B2 | 12/2015 | Scott | |
| 9,289,805 B2* | 3/2016 | Bagnoli | B09C 1/00 |
| 9,334,699 B2 | 5/2016 | Bender | |
| 9,352,264 B2 | 5/2016 | Halk | |
| 9,359,840 B2 | 6/2016 | Pomerleau | |
| 9,364,777 B2 | 6/2016 | Burnett | |
| 9,387,517 B2 | 7/2016 | Carr | |
| 9,399,896 B2* | 7/2016 | Vasshus | E21B 21/065 |
| 9,500,052 B2 | 11/2016 | Ross | |
| 9,512,687 B2 | 12/2016 | Carr | |
| 9,617,811 B2 | 4/2017 | Thiessen | |
| 9,643,115 B2* | 5/2017 | Convery | B07B 1/28 |
| 9,662,599 B2* | 5/2017 | Sewell | B01D 33/0376 |
| 9,677,353 B2 | 6/2017 | Burnett | |
| 9,687,761 B2 | 6/2017 | Thompson | |
| 9,718,008 B2* | 8/2017 | Peresan | B01D 33/0346 |
| 9,752,399 B2 | 9/2017 | Timmerman | |
| 9,795,903 B2 | 10/2017 | Vickers | |
| 9,815,005 B2 | 11/2017 | Burnett | |

(56) References Cited

U.S. PATENT DOCUMENTS

| | | |
|---|---|---|
| 9,828,258 B2 | 11/2017 | Kubala |
| RE46,632 E | 12/2017 | Saiz |
| 9,840,882 B2 | 12/2017 | Bailey |
| 9,896,012 B2* | 2/2018 | Steger ................ B60P 1/165 |
| 9,915,112 B2* | 3/2018 | Geehan .............. E21B 21/065 |
| 9,937,530 B2* | 4/2018 | Holton ................ F16J 15/10 |
| 9,957,762 B2* | 5/2018 | Marshall ............. E21B 21/01 |
| 10,001,464 B2* | 6/2018 | Kronenberger ....... G01N 25/56 |
| 10,029,195 B2* | 7/2018 | Strain ................ B01D 33/804 |
| 10,029,203 B2* | 7/2018 | Riggs ................ B01D 50/20 |
| 10,047,577 B2 | 8/2018 | Bailey |
| 10,081,994 B2 | 9/2018 | Imler |
| 10,094,183 B2 | 10/2018 | Carr |
| 10,167,689 B2* | 1/2019 | Jones .................. B07B 1/42 |
| 10,226,720 B2* | 3/2019 | Vasshus .............. E21B 21/065 |
| 10,233,707 B2 | 3/2019 | Li |
| 10,238,994 B2 | 3/2019 | Ross |
| 10,240,412 B2* | 3/2019 | Tooley .............. B01D 33/0346 |
| 10,328,364 B2 | 6/2019 | Ross |
| 10,335,720 B2 | 7/2019 | Pomerleau |
| 10,350,520 B2* | 7/2019 | Cady ................ E21B 21/066 |
| 10,363,580 B2* | 7/2019 | Bingham ............ E21B 21/066 |
| 10,399,017 B2* | 9/2019 | Sewell ................ B01D 33/72 |
| 10,434,442 B2* | 10/2019 | Peresan .............. B01D 33/03 |
| 10,443,327 B2* | 10/2019 | Frazier ................ B07B 1/28 |
| 10,487,600 B2* | 11/2019 | Culver ................ C02F 1/722 |
| 10,493,383 B2* | 12/2019 | Teodorescu .......... B01D 21/267 |
| 10,532,381 B2* | 1/2020 | Stewart .............. E21B 21/065 |
| 10,533,385 B2* | 1/2020 | Kutryk .............. E21B 21/065 |
| 10,543,512 B2* | 1/2020 | Frazier ................ B07B 4/08 |
| 10,576,503 B2* | 3/2020 | Amaravadi .......... E21B 21/065 |
| 10,619,434 B2 | 4/2020 | Ross |
| 10,641,092 B2 | 5/2020 | Schexnaider |
| 10,643,322 B2* | 5/2020 | Holton ................ B01D 33/804 |
| 10,646,812 B2 | 5/2020 | Riggs |
| 10,648,257 B2* | 5/2020 | Bingham .............. B07B 1/46 |
| 10,704,345 B2* | 7/2020 | Zazula .............. B01D 21/262 |
| 10,704,346 B2* | 7/2020 | Frazier .............. B01D 33/0346 |
| 10,711,545 B2 | 7/2020 | Babri |
| 10,722,821 B2 | 7/2020 | Droke |
| 10,722,919 B2 | 7/2020 | Beach |
| 10,731,428 B2 | 8/2020 | Ross |
| 10,737,202 B2 | 8/2020 | Sharpe |
| 10,751,654 B1* | 8/2020 | Kulbeth .............. B01D 36/04 |
| 10,758,845 B2 | 9/2020 | Droke |
| 10,773,188 B1 | 9/2020 | Kulbeth |
| 10,786,766 B2* | 9/2020 | Strain ................ B01D 33/52 |
| 10,799,817 B2 | 10/2020 | Burnett |
| 10,808,475 B2 | 10/2020 | Carr |
| 10,815,742 B2 | 10/2020 | Holton |
| 10,857,488 B1 | 12/2020 | Kulbeth |
| 10,946,415 B2* | 3/2021 | Strobel ................ B07B 1/42 |
| 10,947,797 B2* | 3/2021 | Weber ................ B01D 21/2444 |
| 10,948,232 B2* | 3/2021 | Niklaus .............. F26B 3/08 |
| 10,967,300 B2 | 4/2021 | Droke |
| 10,974,982 B2 | 4/2021 | Yamashita |
| 11,008,821 B1* | 5/2021 | Steger ................ E21B 21/065 |
| 11,040,300 B1* | 6/2021 | Kulbeth .............. E21B 43/34 |
| 11,059,412 B2* | 7/2021 | Ross ................ B60P 3/2245 |
| 11,065,646 B2* | 7/2021 | Vasshus .............. E21B 21/066 |
| 11,090,584 B2* | 8/2021 | Ross ................ B01D 21/262 |
| 11,105,164 B2* | 8/2021 | Culver ................ C02F 1/38 |
| 11,111,743 B2* | 9/2021 | Ross ................ B01D 33/41 |
| 11,123,664 B2* | 9/2021 | Bailey .............. B01D 33/0376 |
| 11,141,683 B2* | 10/2021 | Ross ................ B01D 21/0045 |
| 11,185,802 B2* | 11/2021 | Peresan .............. B01D 33/0346 |
| 11,199,063 B2* | 12/2021 | Ross ................ B04B 1/20 |
| 11,219,845 B1* | 1/2022 | Kulbeth .............. B01D 33/03 |
| 11,219,846 B1* | 1/2022 | Kulbeth .............. B01D 21/302 |
| 11,224,831 B1* | 1/2022 | Kulbeth .............. B01D 33/76 |
| 11,267,018 B2* | 3/2022 | Herrington .......... B07B 1/469 |
| 11,293,241 B2* | 4/2022 | Zazula ................ B01D 21/34 |
| 11,326,405 B2* | 5/2022 | Al-Mousa ............ B01D 33/17 |
| 11,326,406 B1* | 5/2022 | Kulbeth .............. B01D 19/0068 |
| 11,339,618 B2* | 5/2022 | Shekhar .............. E21B 21/065 |
| 11,439,928 B2* | 9/2022 | Barnes ................ C02F 1/34 |
| 11,499,290 B2* | 11/2022 | Strobel ................ B04C 5/28 |
| 11,525,239 B2* | 12/2022 | Strobel ................ E02F 9/085 |
| 11,541,330 B2* | 1/2023 | Ross ................ B04B 1/20 |
| 11,549,321 B2* | 1/2023 | Larchar .............. E21B 21/065 |
| 11,560,689 B2* | 1/2023 | Strobel ................ E02F 7/06 |
| 11,572,471 B2* | 2/2023 | Steger ................ C08L 91/00 |
| 11,591,866 B2* | 2/2023 | Carr ................ B01D 33/82 |
| 11,591,868 B1* | 2/2023 | Perez ................ B07B 1/46 |
| 11,634,953 B1* | 4/2023 | Kulbeth .............. B01D 36/045 |
| | | 348/51 |
| 11,643,888 B2* | 5/2023 | Kelsey ................ E21B 21/065 |
| | | 175/206 |
| 11,719,056 B2* | 8/2023 | Ivan ................ E21B 27/00 |
| | | 175/48 |
| 11,724,217 B2* | 8/2023 | Bingham ............ B01D 33/41 |
| | | 209/307 |
| 11,739,600 B2* | 8/2023 | Bingham ............ B01D 33/0346 |
| | | 175/24 |
| 11,767,975 B2* | 9/2023 | Valdez ................ F27B 3/205 |
| | | 110/232 |
| 11,802,450 B2* | 10/2023 | Hou ................ E21B 21/066 |
| 11,806,756 B2* | 11/2023 | Jackson .............. B07B 1/55 |
| 11,840,897 B2* | 12/2023 | Ross ................ E21B 21/066 |
| 11,905,677 B2* | 2/2024 | Strobel ................ E02F 3/907 |
| 11,933,121 B2* | 3/2024 | Krohn ................ E21B 21/066 |
| 12,000,121 B2* | 6/2024 | Culver ................ C02F 1/722 |
| 2001/0039887 A1 | 11/2001 | Reddoch |
| 2002/0074269 A1 | 6/2002 | Hensley |
| 2002/0104806 A1* | 8/2002 | Pullman .............. B01D 21/2488 |
| | | 210/744 |
| 2002/0162807 A1 | 11/2002 | Kulbeth |
| 2002/0175111 A1 | 11/2002 | Crabbe |
| 2003/0006201 A1 | 1/2003 | Boutte |
| 2003/0047493 A1* | 3/2003 | Schulte ................ B07B 1/46 |
| | | 209/408 |
| 2003/0062325 A1 | 4/2003 | Kulbeth |
| 2003/0121843 A1 | 7/2003 | Bratten |
| 2003/0146174 A1 | 8/2003 | Hansen |
| 2003/0201237 A1 | 10/2003 | Grichar |
| 2004/0016572 A1 | 1/2004 | Wylie |
| 2004/0084355 A1 | 5/2004 | Seyffert |
| 2004/0134863 A1 | 7/2004 | Tapp |
| 2004/0154963 A1* | 8/2004 | Rayborn .............. E21B 21/065 |
| | | 209/331 |
| 2004/0238414 A9 | 12/2004 | Schulte |
| 2004/0245153 A1* | 12/2004 | Seyffert ............. B01D 33/0376 |
| | | 209/372 |
| 2005/0023038 A1 | 2/2005 | Seyffert |
| 2005/0035033 A1 | 2/2005 | Adams |
| 2005/0040119 A1 | 2/2005 | Kulbeth |
| 2005/0082236 A1* | 4/2005 | Derrick ................ B01D 33/41 |
| | | 210/780 |
| 2005/0183994 A1* | 8/2005 | Hensley .............. B07B 13/16 |
| | | 209/11 |
| 2005/0199532 A1* | 9/2005 | Schulte ................ B01D 33/745 |
| | | 209/405 |
| 2005/0242002 A1 | 11/2005 | Stone |
| 2005/0242003 A1 | 11/2005 | Scott |
| 2005/0242009 A1 | 11/2005 | Padalino |
| 2005/0279715 A1 | 12/2005 | Strong |
| 2006/0011520 A1 | 1/2006 | Schulte |
| 2006/0016768 A1 | 1/2006 | Grichar |
| 2006/0113220 A1 | 6/2006 | Scott |
| 2006/0144779 A1 | 7/2006 | Bailey |
| 2006/0186056 A1 | 8/2006 | Ivan |
| 2006/0243643 A1 | 11/2006 | Scott |
| 2007/0084638 A1 | 4/2007 | Bohnsack |
| 2007/0108103 A1 | 5/2007 | Burnett |
| 2007/0108104 A1 | 5/2007 | Burnett |
| 2007/0108106 A1 | 5/2007 | Burnett |
| 2007/0131592 A1 | 6/2007 | Browne |
| 2007/0278012 A1 | 12/2007 | Smith |
| 2008/0078699 A1 | 4/2008 | Carr |
| 2008/0078700 A1* | 4/2008 | Jones ................ B07B 1/55 |
| | | 209/269 |
| 2008/0083566 A1 | 4/2008 | Burnett |
| 2008/0128334 A1 | 6/2008 | Scott |

(56) References Cited

U.S. PATENT DOCUMENTS

| | | |
|---|---|---|
| 2008/0135463 A1 | 6/2008 | Scott |
| 2008/0223760 A1* | 9/2008 | Vasshus ............... B07B 1/55 209/254 |
| 2008/0230491 A1 | 9/2008 | Wick |
| 2008/0251428 A1* | 10/2008 | Bailey ................ B07B 13/16 209/269 |
| 2008/0277165 A1 | 11/2008 | Nahmad |
| 2008/0283301 A1 | 11/2008 | Sherwood |
| 2009/0008560 A1 | 1/2009 | Gunn |
| 2009/0057206 A1* | 3/2009 | Larson .............. B07B 1/4618 209/401 |
| 2009/0120846 A1 | 5/2009 | Burnett |
| 2009/0145664 A1 | 6/2009 | Larson |
| 2009/0227477 A1 | 9/2009 | Burnett |
| 2009/0242466 A1 | 10/2009 | Burnett |
| 2009/0301939 A1 | 12/2009 | Sorensen |
| 2009/0308819 A1 | 12/2009 | Bailey |
| 2010/0012556 A1* | 1/2010 | Pohle ................... B07B 1/22 209/314 |
| 2010/0038143 A1 | 2/2010 | Burnett |
| 2010/0089652 A1 | 4/2010 | Burnett |
| 2010/0237024 A1 | 9/2010 | Carr |
| 2010/0270216 A1 | 10/2010 | Burnett |
| 2010/0282648 A1 | 11/2010 | Bailey |
| 2011/0005742 A1 | 1/2011 | Marshall |
| 2011/0089122 A1* | 4/2011 | Smith ................ B01D 33/056 210/774 |
| 2011/0114542 A1* | 5/2011 | Carr .................... B07B 1/42 209/369 |
| 2011/0210083 A1 | 9/2011 | Scott |
| 2011/0284481 A1* | 11/2011 | Pomerleau ........... B01D 35/02 210/388 |
| 2011/0297373 A1 | 12/2011 | Timmerman |
| 2012/0073932 A1 | 3/2012 | Burnett |
| 2012/0090898 A1 | 4/2012 | Ross |
| 2012/0118798 A1* | 5/2012 | Scott ................ B01D 33/0376 209/555 |
| 2012/0152860 A1 | 6/2012 | Billeaud |
| 2012/0222854 A1 | 9/2012 | McClung, III |
| 2012/0267287 A1 | 10/2012 | Bailey |
| 2012/0279932 A1* | 11/2012 | Pomerleau ......... B01D 29/117 210/785 |
| 2013/0012372 A1 | 1/2013 | Wick |
| 2013/0015115 A1* | 1/2013 | Landis ................ C02F 1/5281 210/205 |
| 2013/0015141 A1* | 1/2013 | Landis ................ E21B 21/065 210/710 |
| 2013/0062261 A1 | 3/2013 | Bailey |
| 2013/0074360 A1* | 3/2013 | Pomerleau ........ B01D 33/0353 34/79 |
| 2013/0092619 A1* | 4/2013 | Bagnoli ............... E21B 21/068 210/324 |
| 2013/0092637 A1 | 4/2013 | Pomerleau |
| 2013/0105412 A1 | 5/2013 | Burnett |
| 2013/0112631 A1* | 5/2013 | Vasshus ............. B01D 41/00 210/195.3 |
| 2013/0193090 A1* | 8/2013 | Vasshus ............ E21B 21/066 210/406 |
| 2013/0213903 A1 | 8/2013 | Bailey |
| 2013/0220945 A1* | 8/2013 | Carr ................. B07B 1/4609 210/768 |
| 2013/0228532 A1 | 9/2013 | Carr |
| 2013/0248465 A1* | 9/2013 | Sherwood .......... E21B 21/065 210/806 |
| 2013/0319955 A1 | 12/2013 | Bailey |
| 2013/0340791 A1* | 12/2013 | Steiness ................ B09C 1/02 134/10 |
| 2014/0021120 A1* | 1/2014 | Burnett ............... B01D 33/41 210/240 |
| 2014/0046628 A1* | 2/2014 | Ligneul ............... E21B 49/005 702/158 |
| 2014/0091028 A1 | 4/2014 | Pomerleau |
| 2014/0157735 A1 | 6/2014 | Halk |
| 2014/0190904 A1* | 7/2014 | Sewell ................ B01D 33/802 210/330 |
| 2014/0190905 A1 | 7/2014 | Burnett |
| 2014/0299443 A1 | 10/2014 | Mathena |
| 2014/0332282 A1 | 11/2014 | Ross |
| 2014/0339178 A1 | 11/2014 | Carr |
| 2014/0357464 A1* | 12/2014 | Stone .................. B04B 11/02 494/10 |
| 2015/0048037 A1* | 2/2015 | Frazier ................. B07B 1/46 210/416.1 |
| 2015/0096944 A1* | 4/2015 | Krush .................. B07B 1/40 210/780 |
| 2015/0153102 A1 | 6/2015 | Burnett |
| 2015/0176351 A1 | 6/2015 | Carr |
| 2015/0204151 A1 | 7/2015 | Pomerleau |
| 2015/0224427 A1 | 8/2015 | Vickers |
| 2015/0308202 A1 | 10/2015 | Carr |
| 2015/0330165 A1 | 11/2015 | Thiessen |
| 2015/0337609 A9 | 11/2015 | Carr |
| 2015/0367259 A1* | 12/2015 | Imler .................. E21B 21/065 210/744 |
| 2015/0375145 A1* | 12/2015 | Sherwood .......... B01D 33/0361 210/780 |
| 2015/0377020 A1* | 12/2015 | Kronenberger ...... E21B 21/065 210/91 |
| 2016/0023141 A1 | 1/2016 | Pomerleau |
| 2016/0032668 A1* | 2/2016 | Pomerleau .......... B01D 33/804 210/780 |
| 2016/0038858 A1* | 2/2016 | Cady ................ B01D 33/0376 210/330 |
| 2016/0082479 A1* | 3/2016 | Holton ................. B07B 1/28 277/315 |
| 2016/0108688 A1 | 4/2016 | Bailey |
| 2016/0114267 A1* | 4/2016 | Cady ................... E21B 21/065 210/780 |
| 2016/0115065 A1 | 4/2016 | Yamashita |
| 2016/0144377 A1* | 5/2016 | Lomond ............... B07B 13/16 209/17 |
| 2016/0177644 A1* | 6/2016 | Tooley ................. B01D 29/01 210/435 |
| 2016/0184741 A1 | 6/2016 | Zazula |
| 2016/0208568 A1 | 7/2016 | Barnett |
| 2016/0250960 A1* | 9/2016 | Ross .................. B65D 88/126 414/537 |
| 2016/0281447 A1* | 9/2016 | Jones .................. B07B 1/42 |
| 2016/0319616 A1 | 11/2016 | Babri |
| 2016/0356108 A1* | 12/2016 | Kutryk ................. B01D 33/03 |
| 2016/0376858 A1* | 12/2016 | Rankin ............... E21B 44/00 175/38 |
| 2017/0001219 A1* | 1/2017 | Vasshus ............. E21B 21/065 |
| 2017/0016288 A1* | 1/2017 | Culver ................. C02F 1/72 |
| 2017/0022771 A1* | 1/2017 | Frazier .............. B01D 33/0346 |
| 2017/0057393 A1* | 3/2017 | Steger ................. B60P 1/165 |
| 2017/0058621 A1 | 3/2017 | Bailey |
| 2017/0087487 A1 | 3/2017 | Sharpe |
| 2017/0130541 A1 | 5/2017 | Caldwell |
| 2017/0138168 A1* | 5/2017 | Hardeman ............ G01F 1/76 |
| 2017/0145762 A1 | 5/2017 | Gibson |
| 2017/0175464 A1 | 6/2017 | Cooke |
| 2017/0203248 A1* | 7/2017 | Riggs .................. B01D 46/0031 |
| 2017/0252676 A1 | 9/2017 | Ross |
| 2017/0252681 A1* | 9/2017 | Sewell ................ E21B 21/066 |
| 2017/0254163 A1* | 9/2017 | Ross ................. B01D 33/0346 |
| 2017/0268303 A1* | 9/2017 | Zazula ................ E21B 21/065 |
| 2017/0291123 A1 | 10/2017 | Droke |
| 2017/0298703 A1 | 10/2017 | Ross |
| 2017/0312788 A1* | 11/2017 | Amaravadi .......... E21B 21/065 |
| 2017/0320099 A1* | 11/2017 | Stewart ............... B07B 13/16 |
| 2017/0320100 A1* | 11/2017 | Bingham ............ E21B 21/065 |
| 2018/0016856 A1 | 1/2018 | Li |
| 2018/0028947 A1 | 2/2018 | Burnett |
| 2018/0080318 A1 | 3/2018 | Schexnaider |
| 2018/0117503 A1 | 5/2018 | Ross |
| 2018/0126894 A1* | 5/2018 | Ross .................. B60P 3/2205 |
| 2018/0156034 A1 | 6/2018 | Mitchell |
| 2018/0171730 A9* | 6/2018 | Culver ................. B03B 5/34 |
| 2018/0171731 A1* | 6/2018 | Bingham ............ B07B 1/4681 |
| 2018/0179837 A1 | 6/2018 | Holton |

(56) References Cited

U.S. PATENT DOCUMENTS

| | | | |
|---|---|---|---|
| 2018/0193775 A1 | 7/2018 | Ross | |
| 2018/0207554 A1 | 7/2018 | Ross | |
| 2018/0296951 A1* | 10/2018 | Vasshus | B01D 33/048 |
| 2018/0304190 A1* | 10/2018 | Riggs | B01D 46/0031 |
| 2018/0334606 A1 | 11/2018 | Scalley | |
| 2018/0340069 A1* | 11/2018 | Steger | C08L 95/00 |
| 2018/0347299 A1 | 12/2018 | Ross | |
| 2018/0353997 A1* | 12/2018 | Frazier | B07B 4/08 |
| 2018/0371856 A1* | 12/2018 | Carr | B01D 33/0376 |
| 2019/0060794 A1 | 2/2019 | Droke | |
| 2019/0063172 A1 | 2/2019 | Ross | |
| 2019/0145201 A1* | 5/2019 | Jones | B06B 1/16 |
| | | | 209/366.5 |
| 2019/0299128 A1 | 10/2019 | Arefi | |
| 2019/0321857 A1 | 10/2019 | Bailey | |
| 2019/0329295 A1* | 10/2019 | Strobel | B07B 1/005 |
| 2019/0329304 A1 | 10/2019 | Smith | |
| 2019/0336885 A1 | 11/2019 | Ross | |
| 2019/0344203 A1* | 11/2019 | Sewell | E21B 21/065 |
| 2019/0366241 A1 | 12/2019 | Droke | |
| 2019/0374976 A1 | 12/2019 | Herrington | |
| 2020/0018161 A1 | 1/2020 | Stepanov | |
| 2020/0047091 A1 | 2/2020 | Bailey | |
| 2020/0131870 A1* | 4/2020 | Culver | C02F 1/56 |
| 2020/0179841 A1* | 6/2020 | Sewell | B07B 1/4609 |
| 2020/0191630 A1* | 6/2020 | Hardeman | E21B 47/003 |
| 2020/0208476 A1* | 7/2020 | Kapila | B01D 5/006 |
| 2020/0332612 A1 | 10/2020 | Nazzer | |
| 2020/0340312 A1 | 10/2020 | Ross | |
| 2020/0363289 A1* | 11/2020 | Shekhar | E21B 21/065 |
| 2020/0378199 A1* | 12/2020 | Weber | B01D 19/0042 |
| 2020/0378200 A1* | 12/2020 | Krohn | B07B 1/24 |
| 2021/0016297 A1* | 1/2021 | Birchfield | B01D 21/30 |
| 2021/0025253 A1* | 1/2021 | Carr | B01D 33/0376 |
| 2021/0131203 A1* | 5/2021 | Bingham | B01D 33/41 |
| 2021/0154600 A1* | 5/2021 | Barnes | C02F 1/34 |
| 2021/0189812 A1* | 6/2021 | Larchar | E21B 21/065 |
| 2021/0291086 A1* | 9/2021 | Bingham | B01D 33/41 |
| 2021/0355770 A1* | 11/2021 | Ross | B01D 33/0346 |
| 2021/0363839 A1* | 11/2021 | Al-Mousa | B01D 21/283 |
| 2021/0372209 A1* | 12/2021 | Culver | E21B 21/065 |
| 2022/0228450 A1* | 7/2022 | Al-Mousa | B01D 29/085 |
| 2022/0307336 A1* | 9/2022 | Hou | E21B 21/067 |
| 2023/0366279 A1* | 11/2023 | Holman | B01D 33/0376 |
| 2023/0417113 A1* | 12/2023 | Hou | E21B 21/065 |
| 2024/0058843 A1* | 2/2024 | Garza | B07B 1/4663 |
| 2024/0084654 A1* | 3/2024 | Benkley | E21B 21/06 |
| 2024/0167348 A1* | 5/2024 | Iiams | E21B 21/066 |

FOREIGN PATENT DOCUMENTS

| | | |
|---|---|---|
| CA | 2799405 | 11/2011 |
| CA | 2997176 | 3/2017 |
| CA | 2959851 | 9/2017 |
| CA | 3016380 | 9/2017 |
| WO | 91/08375 | 6/1991 |

OTHER PUBLICATIONS

Jaeger, "Hermetically sealed solid bowl decanter, a part of solvent chemistry", Solids/liquids separation practiceand the influence of new techniques: Symposium: Papers and programme, vol. paper 5, 1984, pp.

L. Svarovsky, "Solid-liquid separation", 3rd edition, section 7.5.3, 1990, pp. 277-278.

International Preliminary Report on Patentability for PCT/IB2016/055033, dated Mar. 15, 2018.

Canadian Office Action in counterpart Canadian Application No. 2,959,851, dated Apr. 4, 2023.

Canadian Office Action in counterpart Canadian Application No. 2,959,851, dated Apr. 3, 2024.

* cited by examiner

GAS TIGHT SHALE SHAKER FOR ENHANCED DRILLING FLUID RECOVERY AND DRILLED SOLIDS WASHING

CROSS-REFERENCE TO RELATED APPLICATIONS

The present application is a divisional of U.S. patent application Ser. No. 15/447,971, filed Mar. 2, 2017, which claims the benefit under 35 U.S.C. § 119(e) of U.S. Provisional Application Ser. No. 62/303,169 filed Mar. 3, 2016, the disclosures of which are expressly incorporated by reference herein in their entireties. This application is also related to commonly assigned U.S. patent application Ser. No. 62/212,754 entitled Gas-tight Centrifuge for VOC Separation filed on Sep. 1, 2015, Ser. No. 62/303,163 entitled Gas Tight Horizontal Decanter For Drilling Waste Solids Washing filed Mar. 3, 2016, and Ser. No. 62/303,172 entitled Diluent Treated Drilling Waste Material Recovery Process And System filed Mar. 3, 2016, the disclosures of all three which are herein incorporated by reference in their entireties.

TECHNICAL FIELD

The field of art to which this invention generally pertains is the liquid phase and solid phase separation and processing of drill cuttings.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through conventional mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

The recovered drilling fluids that have been subjected to solids separating devices, such as that of shale shakers or decanter centrifuges, still contain residual amounts of small micron sized solids, otherwise known as Low Gravity Solids or Ultra Fines.

The accumulation of Low Gravity Solids in an active drilling mud system is of significant concern to drilling well operators because they contribute to increased wear of high volume circulating equipment, they can cause the drill string to become differentially stuck in porous formations leading to expensive drilling downtime, and they contribute to reduced rates of drilling penetration, commonly known by those in the industry as the Rate of Penetration or ROP.

With the evolution of new drilling technologies such as horizontal drilling, shale oil or shale gas fracking, and the increasing cost of drilling fluids, the ability to, and benefits of, enhancing drilling fluid back to its new or original condition, would have clear benefits.

Accordingly, there is a constant search for new technologies and improvements to existing technologies to increase the efficiency and effectiveness of reclaiming processes.

BRIEF SUMMARY

A process for liquid phase-solid phase separation of oil base drilling mud-containing drill cuttings is described including flowing the drilling mud-containing drill cuttings over a vibrating screen bed to cause a least a portion of the drilling mud to pass through the screen bed and the drill cuttings to remain above the screen bed, wherein at least one diluent is added to the oil base drilling mud containing drill cuttings to enhance fluids recovery, the entire process being performed in a gas-tight environment preventing escape of diluent from the process into the external atmosphere and preventing introduction of air containing oxygen into the process from the external atmosphere.

Additional embodiments include: the process described above where diluent is added to the unstabilized drill cuttings at a rate sufficient to achieve a yield point of the liquids phase of the drill cuttings feed equal to or less than 0.75 Pa, prior to the unstabilized drill cuttings contacting the vibrating screen bed; the process described above where a spray bar with at least one hole or nozzle is used to evenly deliver diluent or diluents onto the unstabilized drill cuttings after the unstabilized drill cuttings have come in contact with the vibrating screen bed, at a rate sufficient to achieve or maintain a yield point of the liquids phase of the drill cuttings feed, equal to or less than 0.75 Pa; the process described above where the vibrating screen bed mixes the diluent and unstabilized drill cuttings; the process described above where the at least one diluent is added to the unstabilized drill cuttings at a rate sufficient to alter the plastic viscosity of the liquids phase of the drill cuttings feed to less than 5.0 cP, prior to the unstabilized drill cuttings contacting the vibrating screen bed; the process described above where a spray bar with at least on hole or nozzle is used to deliver the at least one diluent onto the unstabilized drill cuttings at a rate sufficient to alter the plastic viscosity of the liquids phase of the drill cuttings feed to less than 5.0 cP, after the unstabilized drill cuttings feed has come in contact with the vibrating screen bed; the process described above where the at least one diluent has a flashpoint less than or equal to 37° C.; the process described above where the mixture of oil base drilling mud-containing drill cuttings and at least one diluent has a flashpoint less than or equal to 37° C.; the process described above where the at least one diluent has a vapour pressure of at least 0.1 Torr and less than 750 Torr; the process described above where the diluent is hexane; the process described above where the diluent is n-butyl alcohol; the process described above where the diluent is ethyl acetate; the process described above where the environment within the gas tight process is maintained below the minimum oxygen content required for ignition of the diluent; the process described above where inert gas is introduced into the environment; the process described above where the inert gas comprises at least one of nitrogen, carbon dioxide, or fuel gas; and the process described above where the inert gas exerts a positive pressure in the process.

An oil base drilling mud-drill cuttings liquid phase-solid phase separation apparatus is also described including a receptacle for receiving oil base drilling mud-drill cuttings slurries, in fluid flow communication with a vibrating screen bed for separating drilling mud from drill cuttings, in fluid flow communication with conduits for conveying away separated drilling mud and drill cuttings, wherein the apparatus additionally contains flanges and seals permitting a hermetically sealed gas exchange with other gas tight processes, into and out of the apparatus.

Additional embodiments include the apparatus described above in fluid flow communication with one or more of solvent wash apparatus, Verti-G dryers, decanters and solid dryers, through hermetically sealed conduits, bellows, hoses and/or conveyors; the apparatus described above where the separation apparatus additionally contains a receptacle inlet, an unstabilized drill cuttings storage device and/or feed hopper in fluid flow communication with the separation apparatus, including a hermetic seal between the unstabilized drill cuttings storage device and/or feed hopper, and the receptacle inlet; the apparatus described above where the hermetic sealing includes at least one of a rotary air lock, positive displacement feed pump, solids trap, and/or fluids trap, preventing the ingress of air containing oxygen.

These and additional embodiments are further described below.

DETAILED DESCRIPTION

Figure 1:
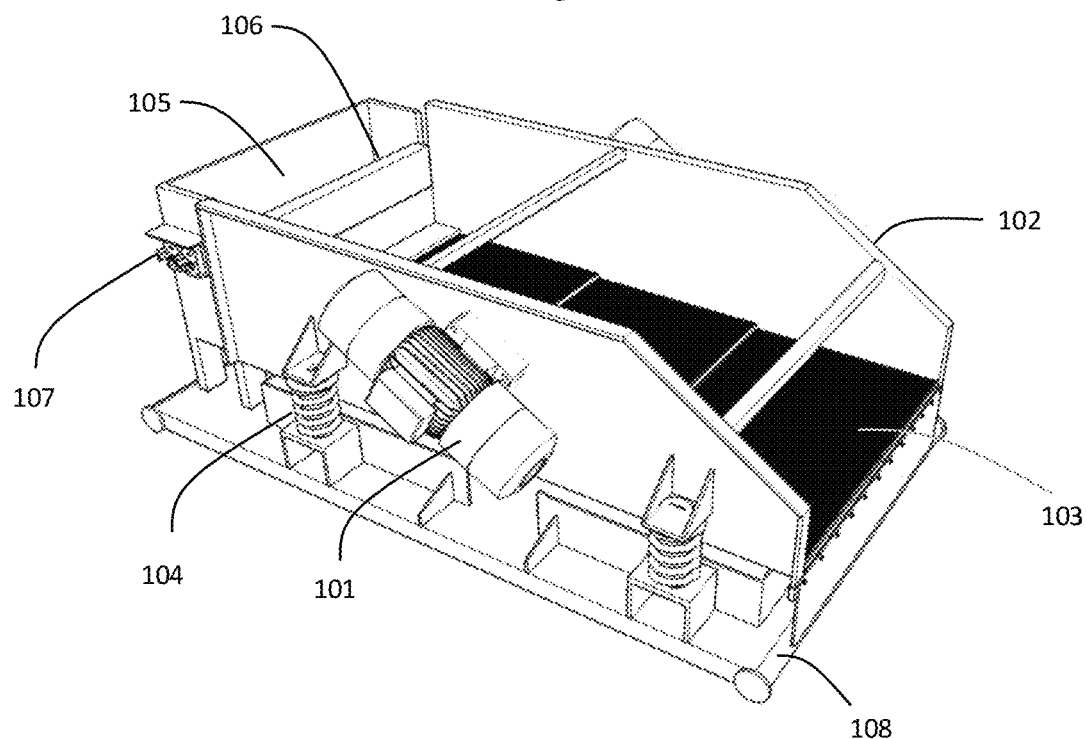
FIG. 1 demonstrates an embodiment of a conventional shale shaker used in the oil and gas drilling industry FIG. 2 demonstrates how a slurry phase moves and transitions in a conventional shale shaker

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Apparatus and methods to enhance the volume of oil base drilling fluid recovered from a gas tight shale shaker, prior to other types of solids management processes or fluids rehabilitation processes is described.

For ease of understanding, as typically used the terms "Oil base mud", "Viscosity" and "Rheology" are provided as follows: oil base mud (OBM) is a drilling fluid system that uses oil as the base ingredient, as opposed to water, which is the base used in gel-chem mud systems, brine mud systems or polymer mud systems. Oil base mud is also known as Invert, and it typically consists of a mixture of oil, emulsified water and drilling mud additives. Viscosity is best understood as the thickness of a fluid. For example, water has relatively low viscosity, whereas a milkshake has a higher viscosity. Rheology, is the science explaining liquid flow including flow in "soft solids". One of the important Rheology properties of OBM is the 'yield point', or the carrying capacity of the fluid. A small solid dropped in a glass of water demonstrates a fluid with no yield point, because the small solid will drop regardless of its size. The same size solid in a milkshake may not drop at all because the force of gravity may not be strong enough to break the yield strength of the milk shake. If it is heavy enough to break the yield point of the fluid it will drop more slowly than the same size solid in water due to the higher viscosity of the milk shake. As is the milk shake, invert is a non-Newtonian fluid and it is commonly modeled as a Bingham Plastic. Bingham Plastics behave like a solid, up to a particular amount of shear stress, when they behave like a liquid; this is known as the yield point of the fluid.

Typically, shale shakers (as known by those within the oil and gas drilling industry) consist of a vibratory screen bed. A slurry comprised of drilling mud and drilled solids is fed into a saddle tank upstream of the vibratory screen bed. The saddle tank includes an overflow weir that causes the slurry to spill evenly onto the vibratory screen bed, along its full width.

Shale shakers apply force, usually measured in terms of G-Force, ranging between four to eight times greater than earth's gravity. The principals behind a vibratory screen is to create a bed where the solids and liquids phase "bounce", causing the liquids phase to yield under the stresses of the gravity and shaker forces. The yield point is the point where a thick liquids phase begins to transition from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because, while conventional shale shakers are a good mechanism to remove a substantial amount of liquids from the solids, the fluid typically contains low micron solids that travel through the porosity of the vibratory screen, rather than be caught on the upper side of the screen with the larger solids.

FIG. 1 is a representation of a typical shale shaker used on drilling rigs. A typical shale shaker consists of a basket (102) upon which screens (103) are secured by means of screen chocks (not shown), which is vibrated by vibratory motors (101) mounted on the side of, or top of the basket. Springs (104) facilitate vibration isolation between the vibrating basket section (102) and a rigid base section (108), which can sit freely on a floor or structure, or be permanently affixed to the floor or structure (not shown). While springs (104) are typically used for vibratory isolation of the basket section, air bags or rubber blocks can also be used.

The shale shaker is activated by turning on electric switches (107), thereby causing the vibratory screen bed to move in an elliptical or linear motion. A slurry is fed into the lower half of saddle tank (105) and once the saddle tank is full, the slurry spills over a weir (106) which is set to a level position to ensure the slurry spills evenly along the full width of the shaker screen(s) (103), thereby maximizing the effectiveness of the screening surface. The saddle tank (105) is sometimes called a possum.

Figure 2:
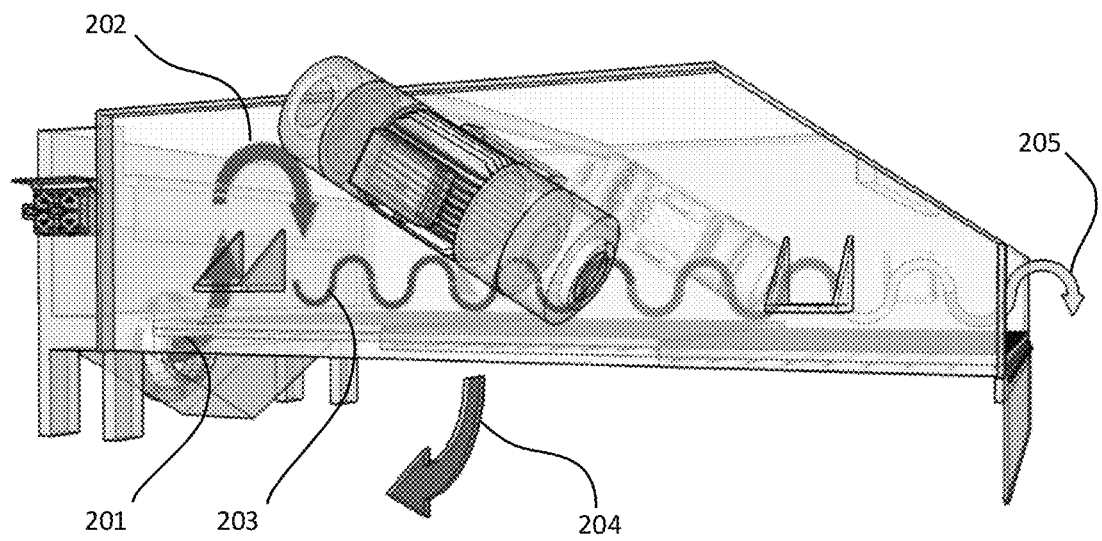

FIG. 2 is an 'X-ray' view of the vibratory portion of a typical shale shaker, to show the flow direction of the slurry and its constituents. As the slurry enters the lower portion of the saddle tank (105), the flow (201) is directed upward, filling the saddle tank, until such time that the flow (202) breaches the weir (106) and spills evenly across the vibratory screen(s) (103). The slurry begins a phase separation wherein the (bouncing) solids phase (203) continues to travel across the first screen, or series of screens, while continuing to release more liquids, until such time that the solids contaminated with less liquids can spill over the end (205) of the vibratory screen bed (103). The recovered liquids phase (204) passes through the vibratory screen bed and spills into a process tank, or can redirected to conventional solids control equipment, such as that of desanders, desilters or centrifuges (not shown in the illustration).

Shale shakers are considered the first line of defense on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they do come in a variety of models, which offer differing gravitational forces, coarse to very fine screen sizes, differing vibratory motions, and as few as one screen, or as many as four, on one or more screen bed elevations.

In short, shale shakers were, and continue to be, the greatest advancement in bulk fluids recovery for the oil and gas drilling industry. However, while they do generally accomplish bulk fluids recovery, they do not necessarily accomplish effective fluids recovery. For example, it would be very typical that a drilling rig runs a pump rate of 1 to 2 cubic meters of drilling mud flow per minute. Cuttings production can vary throughout the drilling of a well, typically offering higher rates in the shallow sections of the well, while offering lower rates in deeper sections of the well. Table 1 has been included to illustrate the general effectiveness of fluids recovery using a typical conventional shale shaker. The table illustrates a likely outcome, when using a value for rate of penetration (ROP)/meters drilled per hour, and average mean for pump rates/cubic meters is multiplied by 1000 litres per minute, an average drill cuttings production value on a given well bore size, and an oil on cuttings (OOC's) value of 35%. In these circumstances, of the total pumped volume per hour, less than 1% (by volume) is lost to the drill cuttings, and greater than 99% (by volume) is recovered.

TABLE 1

| Likely ROP | Pump Rate | Hole Size | Cuttings Production | OOC's (@ 35% 'wet') | Estimated Efficiency |
|---|---|---|---|---|---|
| 10 m/hr | 1.1 m³/minute (~66 m³/hr) | 159 mm (6¼") | 0.3 m³/hr | ~100 litres per hour | 99.85% |
| 25 m/hr | 1.1 m³/minute (~66 m³/hr) | 159 mm (6¼") | 0.75 m³/hr | ~260 litres per hour | 99.6% |

TABLE 1-continued

| Likely ROP | Pump Rate | Hole Size | Cuttings Production | OOC's (@ 35% 'wet') | Estimated Efficiency |
|---|---|---|---|---|---|
| 25 m/hr | 2.2 m³/minute (~132 m³/hr) | 222 mm (8¾") | 1.5 m³/hr | ~525 litres per hour | 99.6% |
| 50 m/hr | 2.2 m³/minute (~132 m³/hr) | 222 mm (8¾") | 3 m³/hr | ~1050 litres per hour | 99.25% |

However, while Table 1 illustrates that the general efficiency of shale shakers is very good, the drilling fluid lost to the drill cuttings over the course of a well is still substantial, due to the large number of pumping hours required for each well.

In recent years, certain advancements have been made to make shale shakers more effective. For example, Canadian Patent Nos. 2,741955; 2,712,774 and 2,799,405 collaboratively describe processes where the underside of at least one portion of the vibratory shaker bed is sealed with one or more funnel shaped coverings, while negative and/or positive air pressure is applied to further enhance the movement of recoverable drilling fluids, air flow is cycled to prohibit blinding of the screens, and/or mist eliminators are employed. The air flow differential causes a sucking or pushing action on at least a portion of one vibratory screen thereby making a dryer drill cutting than would otherwise be possible with a conventional shale shaker.

Despite the operational drawbacks of the above design, for example, high noise levels due to the vacuum pump, higher low gravity solids due to reduced additions of new OBM, and significantly higher power consumption due to the vacuum pump, the design offers higher OBM recovery rates than conventional shale shakers. Because this design is not gas tight, any introduction of a flammable diluent could be catastrophic to workers or process equipment if a spark were introduced or generated.

With the advent of ever increasing environmental standards, and the desire to remediate drilled solids, and the desire to recover more OBM, there is a need for more effective means of fluids recovery equipment. One example of a solvent wash process is described in commonly owned U.S. Pat. No. 8,820,438, where a solvent washing process is employed to dissolve the oil on cuttings, and the clean cuttings are then moved to a drying process for solvent recovery. The recovered OBM and solvent are sent for additional fluids rehabilitation such as gravity separation or filtration, and finally distillation for solvent recovery.

Another example is the use of a Vertical Cuttings Dryer, also known as a Verti-G Dryer. Verti-G dryers use centrifugal force to break the yield stress of the liquids phase and throw it through a screen. The solids are conveyed along the screen to cause the drill cuttings to eventually drop off of the conical screen, and be conveyed away from the Verti-G dryer. The recovered fluids are polluted with low gravity solids and in need of substantial fluids rehabilitation.

Good results can be obtained from both Verti-G Dryers and solvent wash processes, when the feed stock of unstabilized drill cuttings is predictably stable. For example, a volume of unstabilized drill cuttings which is consistent and not too wet (excess OBM), and not to dry, (lacking OBM), will mitigate process upsets caused when the oil wet cuttings feed changes from dryer to wetter, or wetter to dryer, for example. Further, the addition of a diluent will help a Verti-G Dryer or Solvent Wash Process because the diluent is added to alter rheology, thereby allowing OBM to be removed more effectively within enhanced gas tight solids control equipment.

Figure 3:
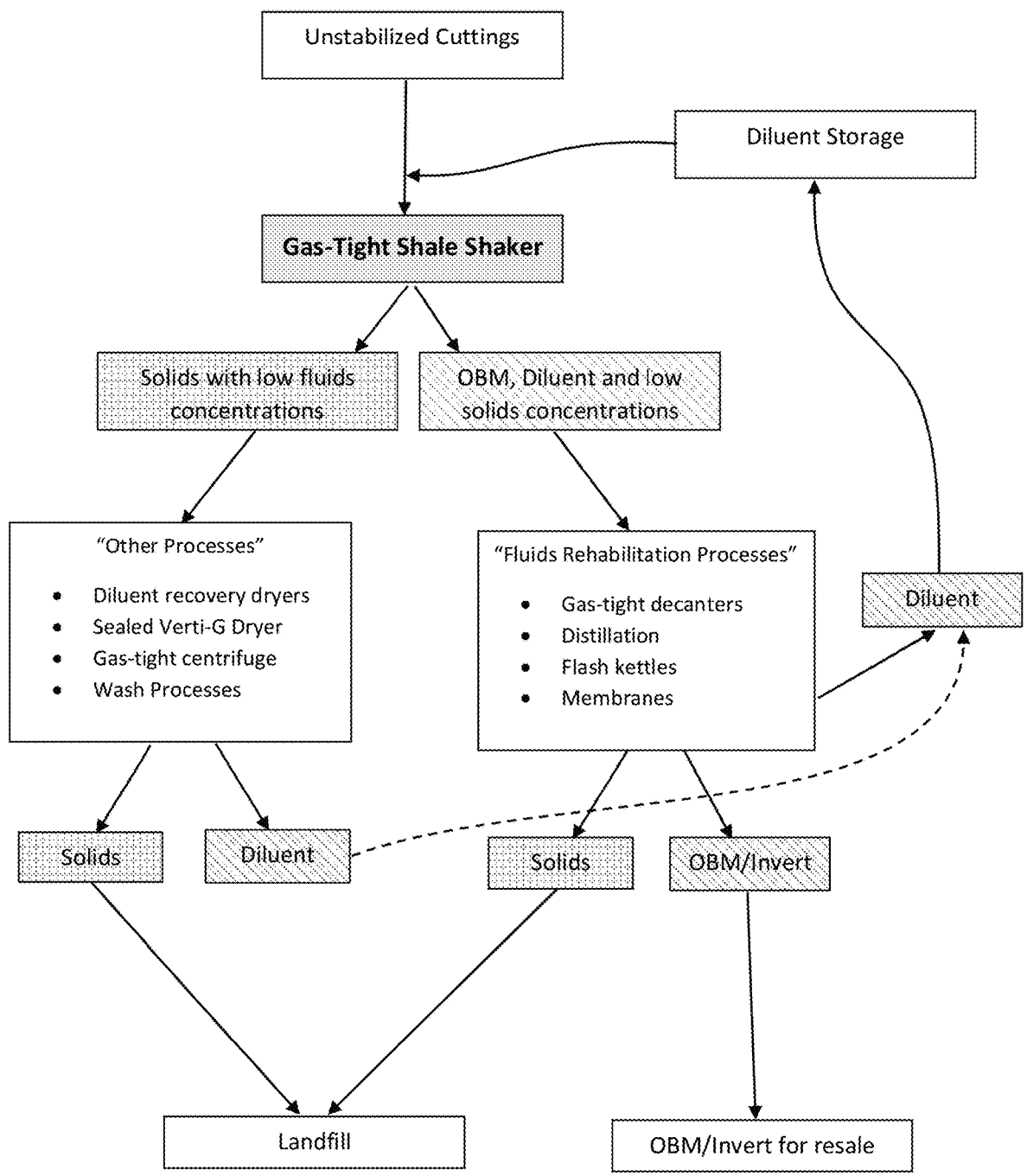
FIG. 3 is a flow chart embodiment demonstrating a gas tight shale shaker as described herein combined with additional cuttings treatment systems, or fluid rehabilitation equipment FIGS. 4a, 4b, 4c & 4d demonstrate an embodiment of a gas tight shale shaker as described herein, capable of diluent additions with the contaminated drill cuttings, while maintaining a safe process FIGS. 5a & 5b demonstrate an embodiment of how the lower portion of a vibrating bed is sealed and how the egress of the liquids phase is facilitated through the sealed lower section.

Thus is the need for an improved method to remove a substantial portion of the oil on cuttings. FIG. 3 is an illustrative flow chart demonstrating where such an embodiment could be located, relative to other processes.

As described herein, a low gravity solids/liquids separation device is used to separate the components of a slurry into a first solids phase with a lower liquids content, and a second liquids phase with a lower solids content. Specifically, a conventional vibratory screen bed, commonly known as a shale shaker by those in the oil and gas industry, modified as described herein, can be used. To increase the efficiency of the separation of the liquids and solids phase, a diluent (or diluents) is added to the process and the apparatus is sealed to prevent volatiles from escaping the gas tight design, which could cause irreparable harm to additional processes or operators within the area, thereby creating a solids phase and liquids phase that are better defined and manageable in other processes as further demonstrated below.

The addition of a diluent has shown to increase the effectiveness of a shale shaker during field testing. For example, an M-I SWACO MONGOOSE™ shale shaker was used to test the effectiveness of adding a diluent to unstabilized OBM drill cuttings, prior to being passed over the shale shaker. Unstabilized OBM drill cuttings were obtained from a drilling rig, wherein the drill cuttings had been subjected to a conventional shale shaker (model unknown) wherein as much of the OBM had been removed as was possible, and the solids phase (containing some liquids) was collected in a storage tank for transportation to the test facility. No bulking agents were added to the drill cuttings prior to, or during transport. The drill cuttings were unloaded at the test facility and a retort completed to determine the volume of OBM, compared to drill cuttings. A retort is a representative sample that is placed in a small cylinder and heated to 500° C. so that all liquids boil out of the sample. The liquids are forced out of the cylinder where they recondense in a cooler, and drip into a test tube for measurement. The results of the retort confirmed that the sample contained 31% liquids by volume.

Hexane was used as a diluent during the test, which was conducted at two different conveyance rates of drill cuttings, to a fixed volume of diluent. The first test included a diluent pump rate 480 litres per hour, to an auger rate of 500 litres of drill cuttings per hour. The diluent was introduced to the cuttings feed auger about 4 meters before the slurry reached the vibratory bed of the shaker, allowing for about 2 minutes of contact/mixing time. About 15 minutes into the test, three samples were obtained at two minute intervals and stored in sample jars marked as Samples 1, 2 & 3. Following the third sample collection, the drill cuttings feed auger speed was increased for a smooth transition to the second test. The second test included a diluent pump rate 480 litres per hour, to an auger rate of 1000 litres of drill cuttings per hour. As in the first test, three samples were obtained at two minute intervals and stored in sample jars labelled as Samples 4, 5 & 6.

Figure 8A:
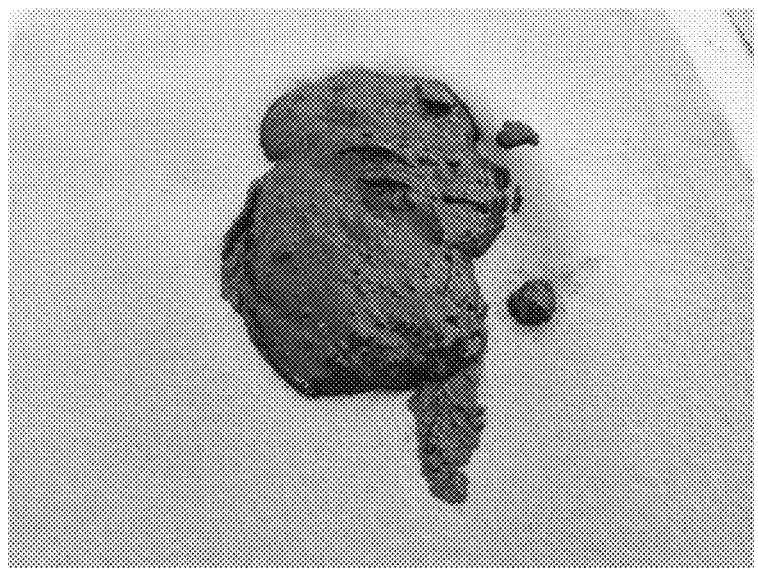
FIGS. 8a, 8b and 8c are photos showing reductions of the free liquids phase using two diluent cuttings feed rates.
Figure 8B:
Figure 8C:

During the two tests, visual observations were made of the 'wet' cuttings feed and 'dry' shaker bed overflow and there was an obvious improvement in the free liquids phase reductions at both diluent/cuttings feed rates. See, for example, FIGS. 8a, 8b & 8c, where 8a demonstrates wet cuttings feed as received, 8b dry shale shaker overflow (Sample 3), and 8c dry shale shaker overflow (Sample 6).

Retorts were conducted on the six samples and the results of the tests are shown in Table 2.

TABLE 2

| Retort Identification (Retort consisted of a standard retort tester, common to the oil and gas industry - 10 ml model) | Liquids phase (by volume %) | Solids phase* (by volume %) |
| --- | --- | --- |
| Unstabilized OBM drill cuttings (as received) | 31% | 69% |
| Sample 1 (480 litres/hr diluent: 500 litres/hr cuttings) | 16% | 84% |
| Sample 2 (480 litres/hr diluent: 500 litres/hr cuttings) | 16% | 84% |
| Sample 3 (480 litres/hr diluent: 500 litres/hr cuttings) | 16% | 84% |
| Sample 4 (480 litres/hr diluent: 1000 litres/hr cuttings) | <18% | >82% |
| Sample 5 (480 litres/hr diluent: 1000 litres/hr cuttings) | 16% | 84% |
| Sample 6 (480 litres/hr diluent: 1000 litres/hr cuttings) | 16% | 84% |

*The solids phase (vol %) is inferred; a retort is a measure of volume and as such, the volume at the start of the test is 100% of the cylinder volume; post testing, the solids phase is inferred by calculating 100%, minus the liquids phase actually measured The results show that despite being previously subjected to a conventional shale shaker at the drilling rig, the additions of a diluent facilitated the removal of additional OBM, reducing the liquids phase portion of the first sample by almost 50% to approximately 16% (by volume), compared to 31% (by volume). The second and third samples yield the same results as the first sample, showing a consistent trend during testing. In review, the second test was a repeat of the first test, only changing the volume of cuttings feed to the fixed diluent feed rate. While the results of Sample 4 suggested a leaner mixture of diluent to cuttings feed would yield a 'wetter' cuttings carryover, Samples 5 & 6 returned to the same liquids phase reductions as that of Samples 1, 2 & 3. In view of the obvious value of the diluent, it is captured and reclaimed as well.

Figure 4A:
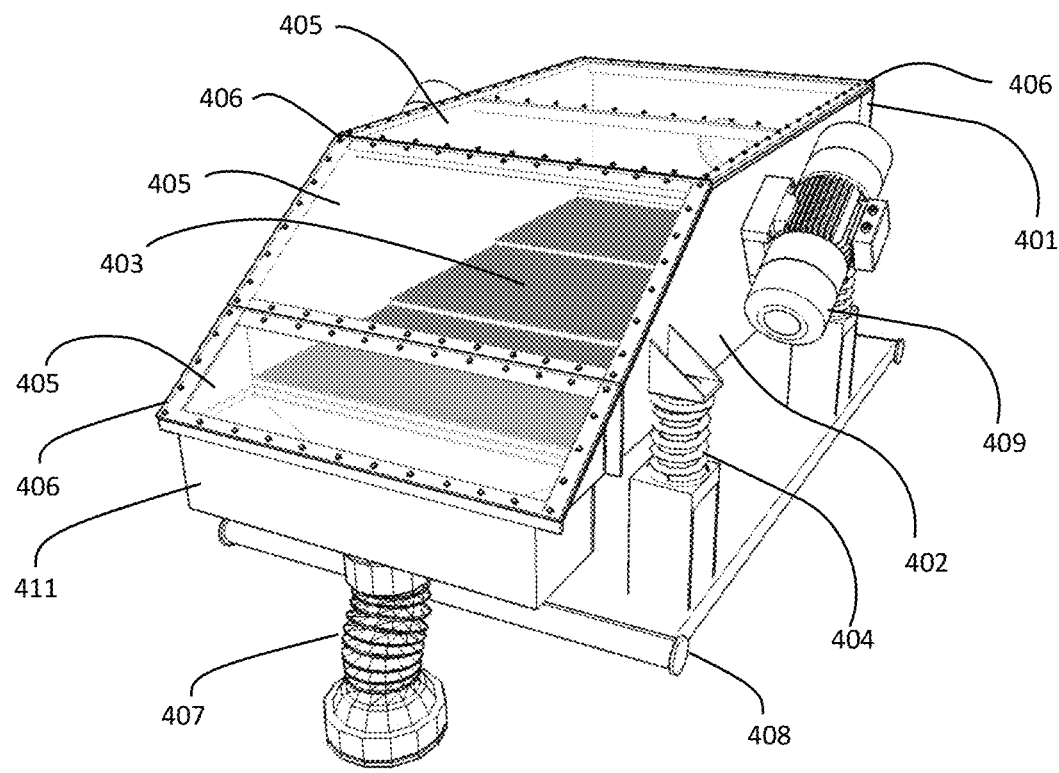
Figure 4B:
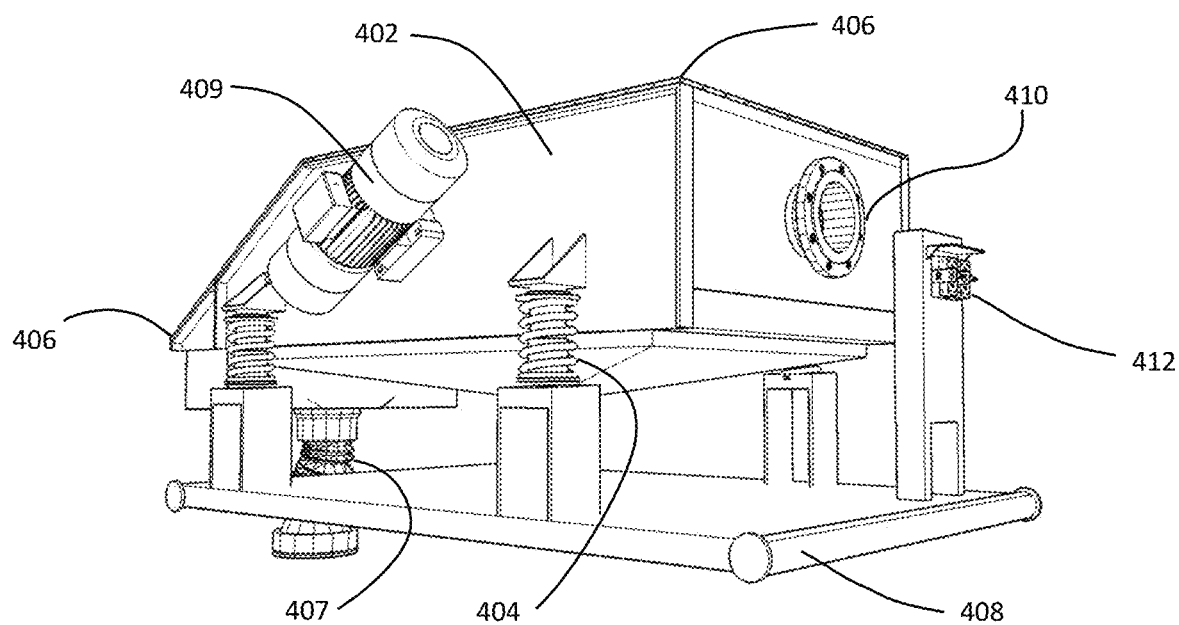
Figure 4C:
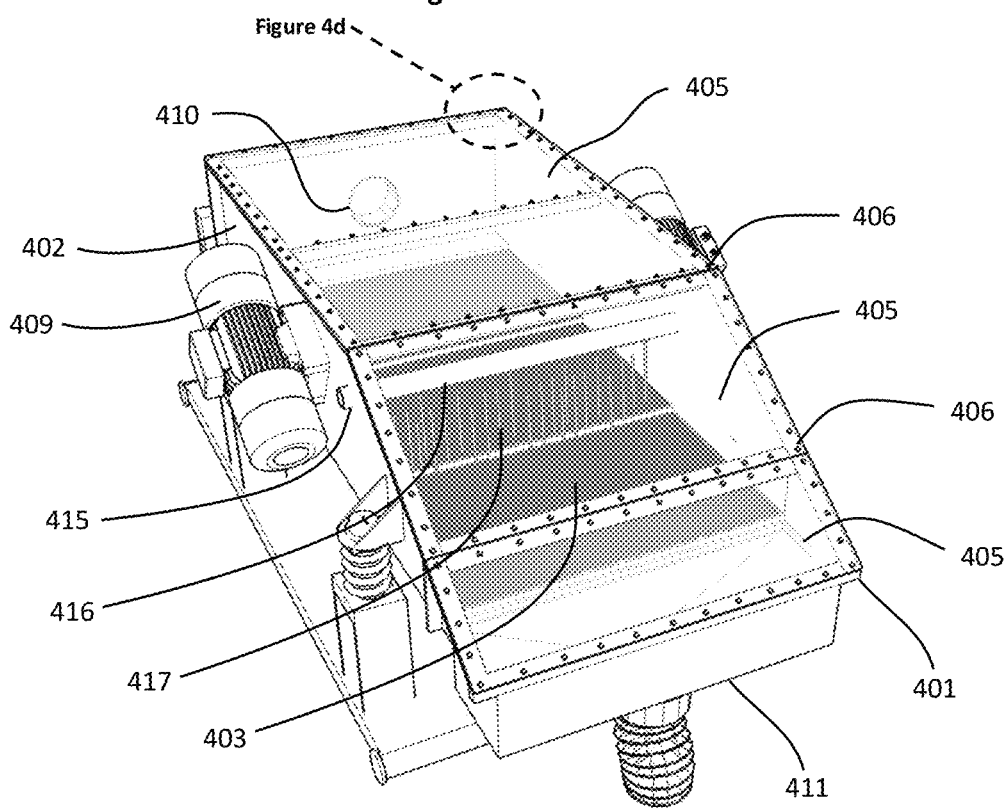

While similar to a conventional shale shaker, FIGS. 4a, 4b and 4c are representations of a gas tight shale shaker, capable of separating a liquids phase from a solids phase when a diluent is added to the slurry feed, potentially creating a flammable slurry. The gas tight shale shaker design consists of a basket (402) upon which fine screens (403) are mounted to, which is vibrated by vibratory motors (409) mounted on the side of (illustrated), or top of (not shown) the basket. Springs (404) facilitate vibration isolation between the vibrating basket section (402) and a rigid base section (408), which can sit freely on a floor or structure, or be permanently affixed to the floor or structure (not shown in the illustration). While springs (404) are typically used for vibratory isolation of the basket section, air bags or rubber blocks can also be used.

Figure 4D:
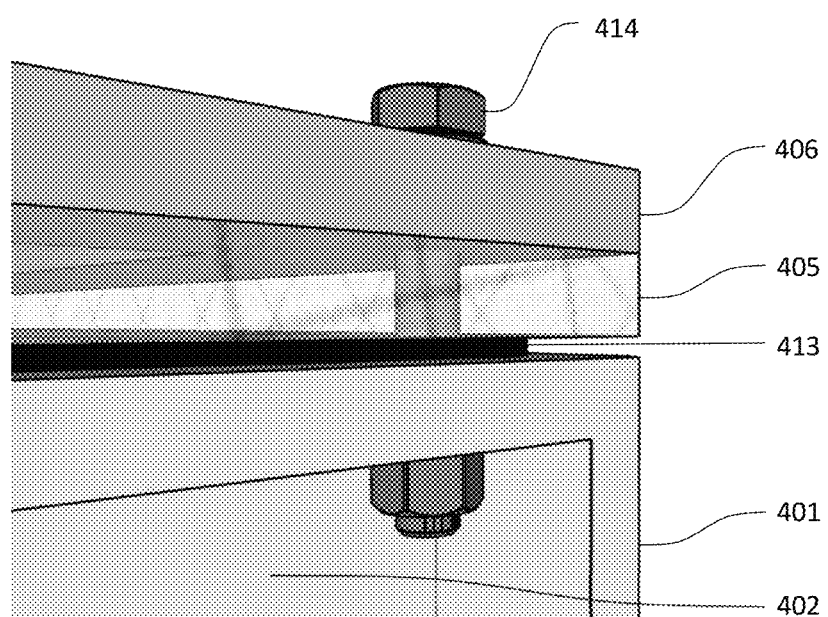

The basket (402) of a gas tight shale shaker includes a flange (401) which goes around the top inner or outer edge of the basket (as well as the wall sections for rigidity), so that lid sections (405) can be placed over the shaker bed basket section to ensure oxygen cannot enter the process, and the inner atmosphere cannot escape the process. FIG. 4d shows the embodiment of a lid section, which can be constructed of a rigid metal cover, composite materials, or a translucent cover such as that of shatter proof glass, LEXAN™ polymer or acrylic (405). The use of a translucent cover is preferred because it offers the user the ability to view the process while maintaining a gas tight environment. A gasket (413) made of conventional rubber or conventional silicone material suitable for sealing against volatile organic solvents is also added to the underside of the lid sections, prior to bolts with washers and nuts (414) being inserted through the (top) flange (406), and lower flange (401) (which is by extension, part of the basket), added to give the basket the necessary rigidity and strength required for continuous vibration. The upper and lower flange 'sandwich' the lid section in place and help to mitigate stress cracking of the lid section, which can occur because of the vibratory action of the basket (402).

While an upper and lower flange can mitigate stress cracking of the gas tight covers, lightweight materials of construction can cause a loud 'drumming' effect, which is obviously undesirable for workers that may be present in the immediate area. As such, any materials of construction selected should be done with rigidity and long-life integrity in mind. The oxygen content in the system can be measured and monitored, and is preferably kept below the minimum oxygen level required for ignition of the diluent(s) in use, which can vary from one diluent to another, or in the case of a mixture of diluents.

Figure 7A:
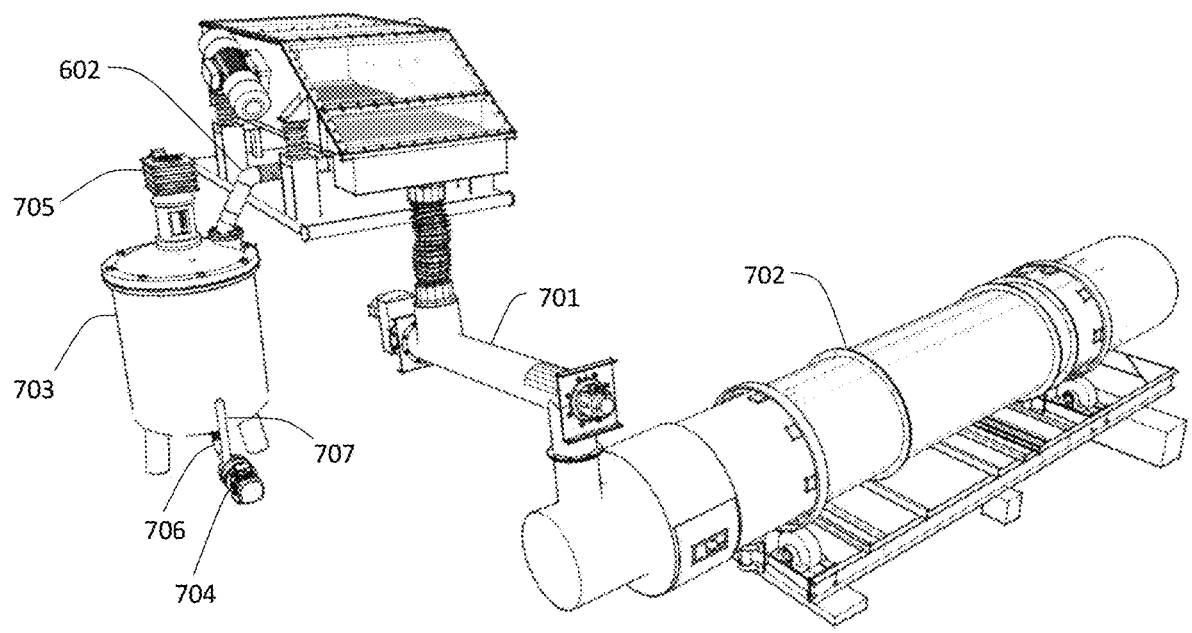
Figure 7B:
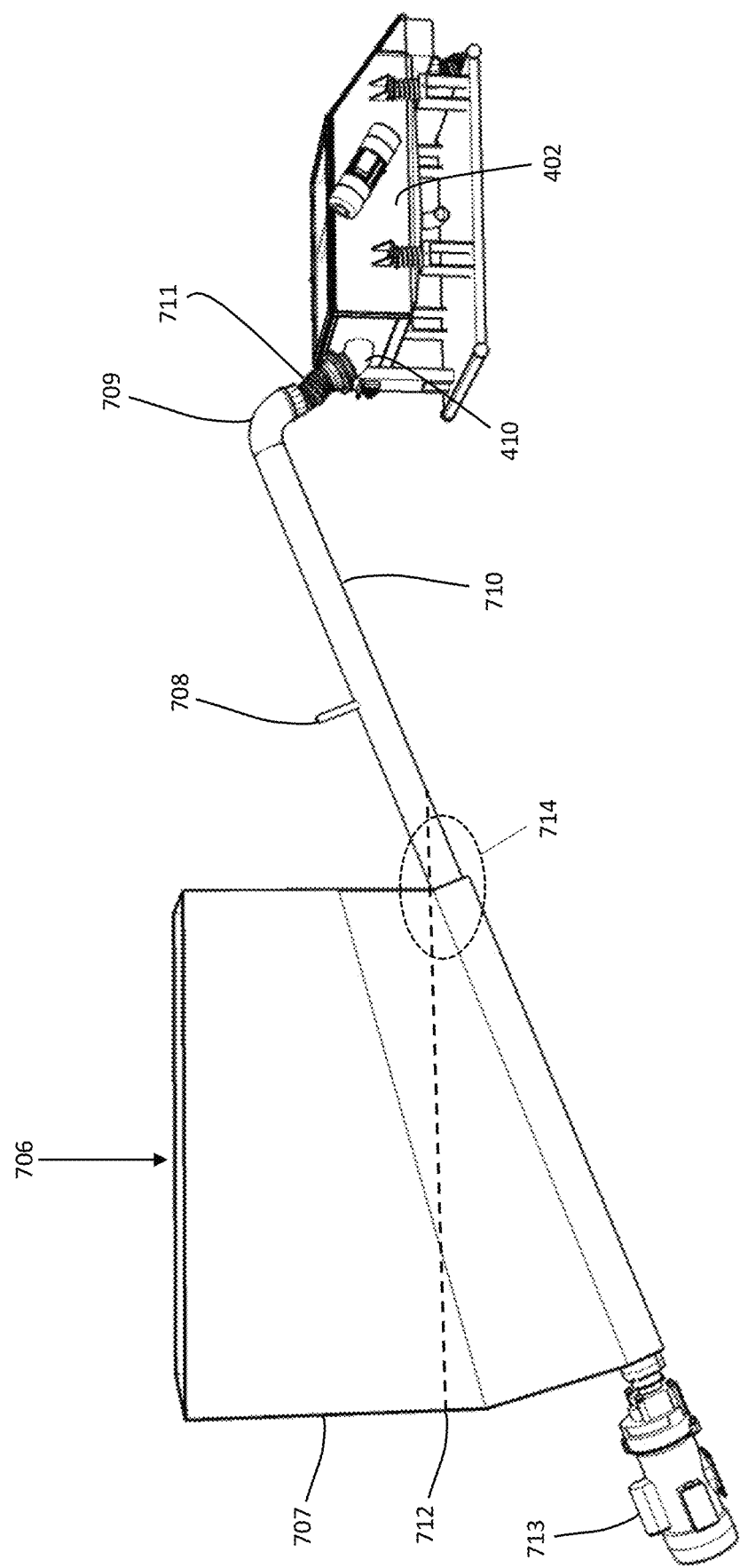

In an effort to ensure transient oxygen does not enter the process through the inlet feed of unstabilized drill cuttings, as demonstrated in FIG. 7b, the drilling waste (a mixture of oil base drilling fluid and drill cuttings) is received and stored until the facility is ready to process the waste. The unstabilized drill cuttings are loaded (706) into a hopper (707) which maintains a minimum volume (712) over the feed auger (710), a fluid leg that prohibits the entry of unwanted air to the process, or the escape of a volatile diluent to the atmosphere. The safe minimum level of unstabilized drill cuttings in the hopper can be controlled either by means of a weight indicator on the hopper (not shown) or overhead level transducer (not shown), or by operator observation. The process feed rate is controlled by a gear reduction motor (713) coupled to the feed auger (710) with a solids/fluids trap (714), or a rotary air lock (not shown), or a positive displacement feed pump (not shown), preventing the ingress of air containing oxygen, which allows conveyance of the solids to occur at a controlled and measured rate, also known as characterization of the flow. Given the need for vibration isolation between the shaker basket (402) and the feed auger, a flexible conduit or bellows (711) must be installed between flange/coupling/fitting (410) connected to the shaker basket (402) and the flange/coupling/fitting (709) of the feed auger (710).

Diluent is added (708) to the unstabilized drill cuttings feed auger (710) to allow the less viscous diluent to mix with the cuttings feed, thereby causing the OBM liquid in the wet cuttings feed to have a lower yield point, or to eliminate the yield strength entirely, and lowering the viscosity of the liquid, and facilitating separation of the liquids phase and solids phase when they are subjected to gravitational or centripetal forces to settle and separate the solids from the liquid. The rate of diluent additions is sufficient to eliminate or significantly reduce the yield point and to reduce the (plastic) viscosity of the liquids phase in the unstabilized drill cuttings feed. The length of the conveyor between the hopper and the inlet of the shale shaker is of less importance to the embodiment except that the length must be long enough to ensure there is adequate mixing of the diluent and unstabilized drill cuttings during the term of conveyance. The volume of diluent added to unstabilized drill cuttings would be approximately 1:1, with a minimum ratio being 1:5, and a maximum ratio being 5:1. The "ideal ratio" of diluent to unstabilized drill cuttings could be influenced by capital cost of the equipment, operating costs for the facility, and throughput versus maximizing drilling fluid recovery. Table 3 has been included to show the expected yield point (represented in Pascal's) and predicted resulting plastic viscosity (represented in Centipoise) of a mixture of diluent and unstabilized drill cuttings, at various ratios. For the purposes of obtaining representative data for Table 3, hexane was mixed with oil base drilling mud to determine the rheological changes, and the data was used to build the predicted Plastic Viscosity (PV represented in centipoise cP)/Yield Point (YP represented in pascals Pa) table below.

TABLE 3

| Ratio of diluent to unstabilized drill cuttings | Temperature | Resulting PV (cP) | Resulting YP (Pa) |
| --- | --- | --- | --- |
| 0:1 | 50° C. | 25 | 4.5 |
| 0:1 | 0° C. | 89 | 12 |
| 0.1:1 | 0° C. | ~4.9 | ~1.3 |
| 0.5:1 | 0° C. | <1.0 | <1.0 |
| 1:1 | 0° C. | ~0.5 | ~0.5 |
| 1.5:1 | 0° C. | ~0.5 | <0.5 |

An inert gas is also required to ensure there is a lack of oxygen in the gas tight environment. Typically, nitrogen or carbon dioxide are used to purge the oxygen out of the gas tight environment, prior to any equipment or processes using the otherwise flammable diluent. The inert gas atmosphere can be shared with other processes, such as that of a gas tight decanter, solvent wash tanks, or solids drying equipment, for example.

Prior to the feed of the drill cuttings being delivered to the gas tight shale shaker, a diluent or diluents are added to the unstabilized drill cuttings. The diluent must be chosen for its specific characteristics, bur for the purposes of this invention, generally diluents with a vapor pressure (corrected to a gauge pressure at 20° C.) of at least 0.1 Torr and less than 750 Torr, and further having a flash point of less than 37° C. will quickly dissolve into solution with the oil in the OBM and lower or eliminate the yield strength and lower the viscosity (for example, hexane, n-butyl alcohol, ethyl acetate, etc.). The diluent must be added prior to the drill cuttings being fed into the gas tight shale shaker to allow the less viscus diluent to mix with the cuttings feed, thereby causing the liquids phase of the cuttings feed to have a lower yield point than OBM alone, and facilitating greater separation of the liquids phase and solids phase when the two are in contact with the vibratory shaker bed.

Alternatively, or in conjunction with diluent being added to the unstabilized drill cuttings before the slurry comes in contact with the vibratory shaker bed, the diluent can be added once the feed is on the vibratory shaker bed. Incorporating a spray bar with one or more nozzles (416) above the vibratory shaker bed (over the first shaker screen) and within the gas tight enclosure would permit the diluent (417) to become mixed with the unstabilized drill cuttings feed by using the gravitational forces of the shaker bed itself. In the case of the mixture of diluent and unstabilized drill cuttings being mixed with the feed auger, the liquids phase would immediately begin leaving the solids phase on the vibratory bed because the lower yield point of the liquids phase would facilitate greater separation. Thus, diluent pumped to a connection on the outside of the vibratory bed (415) would permit the diluent to enter the gas tight enclosure and exit the spray bar through the holes and/or nozzles (416) over the middle or second half of the shaker screen(s), effectively being applied as a rinse (or double wash) to the already partially cleaned drill cuttings thereby facilitating a lower amount of residual oil on cuttings (because the 'rinse' diluent is being added to pre-cleaned cuttings thereby decreasing the residual oil phase and increasing the ratio of solvent to residual oil).

The gas tight shale shaker is activated by turning on electric switches (412), thereby activating the vibratory screen bed. A slurry of drill cuttings and diluent is fed into the basket section (402) through a flexible conduit or hose which connects via a flange (410) or aero-union. The slurry of drill cuttings and diluent spills onto the screen bed (403), or alternatively, onto a spill plate (not shown), mounted just below the inlet flange (410) and above the shaker screens (403) to ensure the slurry has an opportunity to spill evenly along the full width of the shaker screen(s) (403), thereby maximizing the effectiveness of the screening surface.

Once the drill cuttings have been subjected to the higher gravitational vibrations of the screen bed, the cuttings containing less OBM contamination fall off the end of the vibratory bed into the discharge chute (411) and downward through the flexible conduit or hose (407) and are conveyed by screw auger to (or fall directly into) additional processes that can include for example, one or more from the following list (and supporting description):

solvent wash equipment; see, for example, a solids washing process as described in U.S. Pat. No. 8,820,438, the disclosure of which is herein incorporated by reference, where a solvent washing process is employed to dissolve the oil on cuttings, by introducing the unstabilized drill cuttings into an inclined auger tank filled with solvent as the wash medium.

gas tight Verti-G dryers; see, for example, commonly owned U.S. Patent Application, Ser. No. 62/303,172, entitled Diluent Treated Drilling Waste Material Recovery Process And System filed of even date herewith, the disclosure of which is herein incorporated by reference.

solids dryers; see, for example, a typical solids drying process to remove the residual diluent as shown in U.S. Pat. No. 8,820,438, the disclosure of which is herein incorporated by reference, where heat transfer fluid is pumped through both the jacket of the dryer and the auger flighting to maximize the heat transfer area.

Figure 5A:
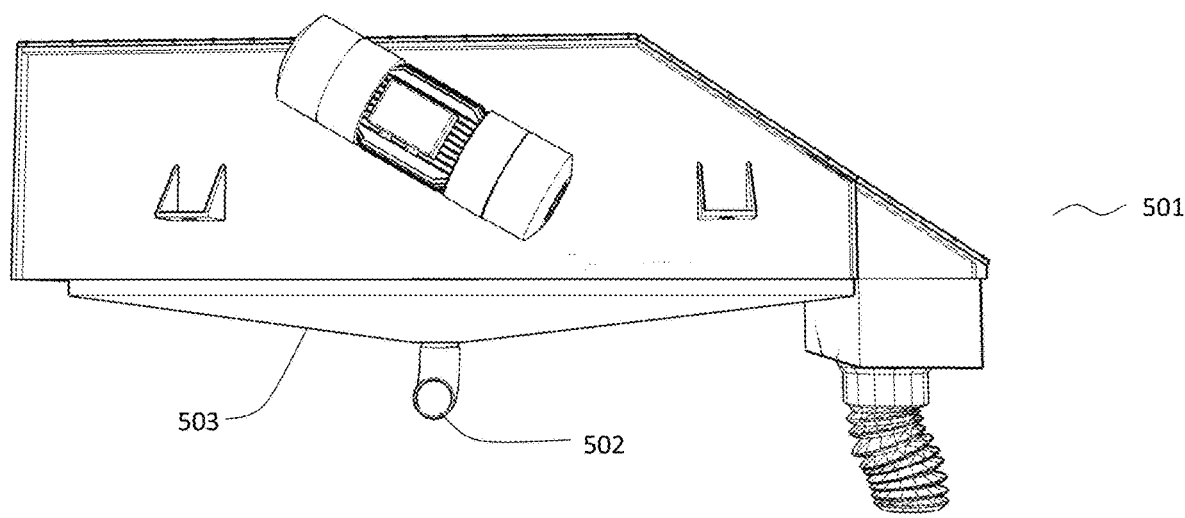

The liquids phase consisting of OBM, low gravity solids, diluent (and in some cases free water) falls downward through the vibrating screen bed (403) where it drips through a lower opening into a funnel shaped sealed section (503) below the screen bed, as shown in FIG. 5a. The liquids phase accumulates into the lowest point of the lower sealed cover and flow from the cover through an opening or outlet (502) that is connected to a flexible conduit or hose (602) where the recovered fluids can be sent for additional fluids rehabilitation.

FIG. 7a shows an embodiment of a gravity drainage tank (703) wherein the liquids phase can simply drain to a sealed storage tank for temporary storage prior to being evacuated by means of a pump (704) which is connected to the temporary storage tank. The pump pulls the stored slurry from the knock out tank (703) through a suction pipe (706), and conveys the stored liquids phase through a pump outlet (707) to another process, such as that of a gas tight decanter, see, for example, commonly assigned U.S. Patent Application Ser. No. 62/212,754, the disclosure of which is herein incorporated by reference, or filtration equipment, clarifier tanks, molecular separation by membrane or distillation equipment. Given the liquids phase includes a diluent, the low gravity solids phase is susceptible to premature settling, so a paddle mixer (705) or other tank stirring system could be employed to ensure the low gravity solids and liquids phase remain uniformly suspended until they are sent for rehabilitation.

Figure 5B:
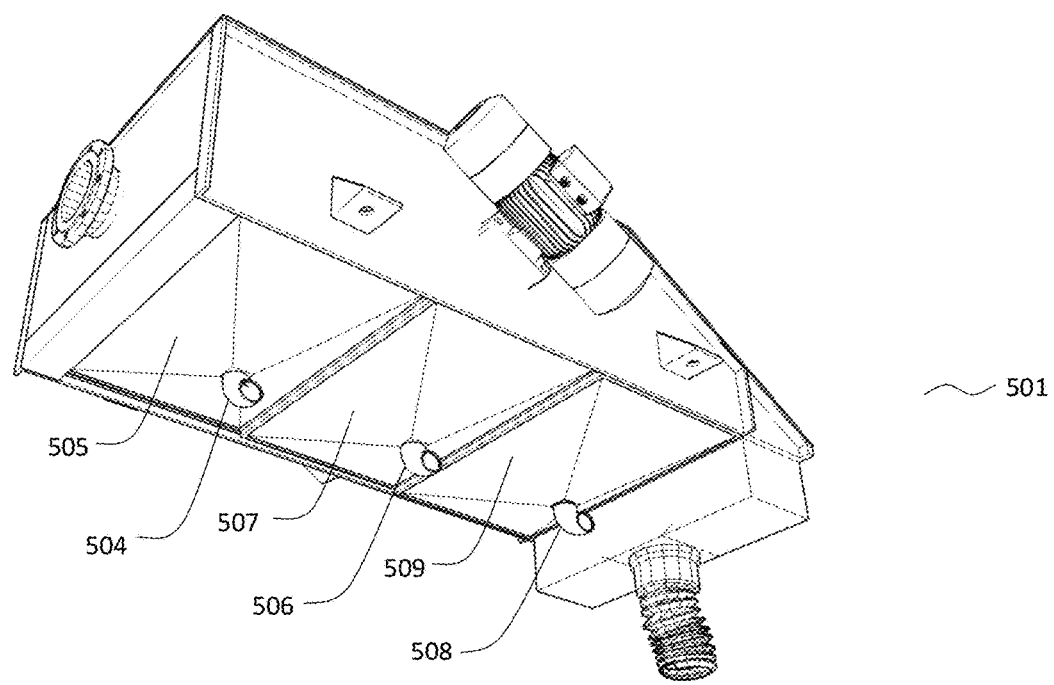
Figure 6:
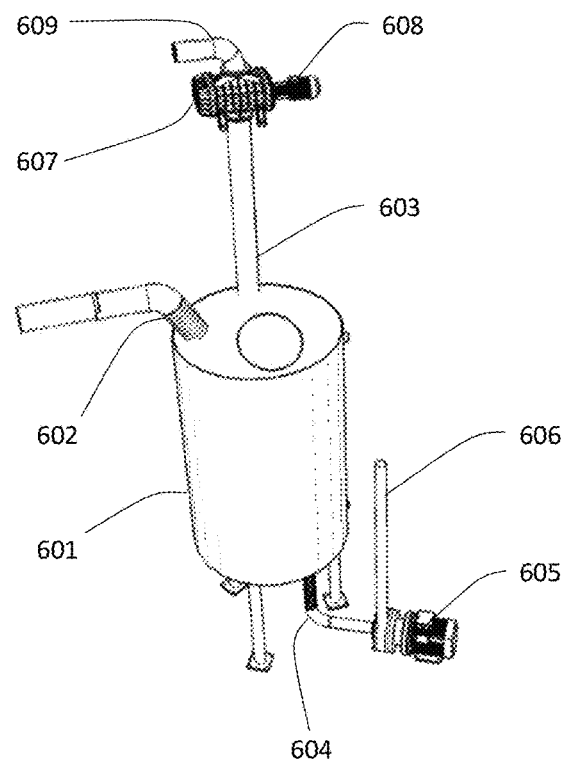
FIG. 6 demonstrates an embodiment of a vacuum assist knock out tank and liquids phase transfer system FIG. 7a demonstrates an embodiment of other processes that could be connected to a gas tight shale shaker and FIG. 7b shows the hopper and air lock system in a typical connected arrangement to the gas tight shale shaker, as described herein

Alternatively, FIG. 5b shows a design wherein each shaker screen can have an independent cover (505) (507) (509) and independent connection points (504) (506) (508) which are connected to separate gravity fed collection tanks (703) or separate vacuum assist knock out tanks (601), or combination thereof. FIG. 6 shows an embodiment for a vacuum knock out tank (601) which is attached to the shaker connection points (502) (504) (506) (508) via a flexible conduit or hose (602) to ensure the vibratory action of the shaker basket (501) is not passed through the hose to the knock out tank. A vacuum is applied to the knock out tank via a rigid riser (603) located on the top of the knock out tank. The riser is connected to the vacuum pump (607), which is most typically powered by an electric motor (608) that can be controlled by a variable frequency drive to ensure the negative air pressure on the shaker screens from time to time is either intermittent so that solids are released from the vibratory screens, or the air velocity is slowed to ensure the solids phase do not become stuck on the vibratory screen bed. At least a portion of the atmosphere in the gas tight shaker moves with the liquids phase from the upper side of the shaker screens, through the shaker screens into the knock out tank where the liquids phase is retained and the atmosphere is permitted to continue through the vacuum pump where it exits the vacuum pump through the return exhaust (609) and back to the slurry inlet of the shale shaker (410) or solids outlet of the shale shaker (407), or into a separate atmosphere communication port (not shown) via a flexible hose or conduit (not shown), so that the inert atmosphere is continually replenished and transient oxygen is not introduced. The mixture of OBM, diluent and low gravity solids will be susceptible to solids settling so every effort is made to ensure the slurry is pulled from the knockout tank via a suction pipe (604), into the pump (605) where some of the pump discharge (606) is circulated back to the knock out tank to ensure the liquids and low gravity solids remain in uniform suspension.

Alternatively, FIG. 7a shows an embodiment of a gravity drainage tank (703) wherein the liquids phase can simply drain to a sealed storage tank for temporary storage prior to being evacuated by means of a pump (704) which is connected to the temporary storage tank. The pump pulls the stored slurry from the knock out tank (703) through a suction pipe (706), and conveys the stored liquids phase through a pump outlet (707) to another process, such as that of a gas tight decanter, see, for example, commonly assigned U.S. Patent Application Ser. No. 62/212,754, entitled Gas Tight Shale Shaker For Enhanced Drilling Fluid Recovery And Drilled Solids Washing the disclosure of which is herein incorporated by reference, or filtration equipment, clarifier tanks, molecular separation by membrane or distillation equipment. Given the liquids phase includes a diluent, the low gravity solids phase is susceptible to premature settling, so a paddle mixer (705) or other tank stirring system could be employed to ensure the low gravity solids and liquids phase remain uniformly suspended until they are sent for rehabilitation.

The gas tight design has the added benefit of automatically de-misting by design, in that the entire process ensures vapours recirculate in a closed loop, eliminating fluid loss due to misting.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for separating drilling-mud cuttings from an oil base drilling fluid comprising:
   a receptacle for receiving a slurry of drilling-mud cuttings and oil base drilling fluid, the receptacle having a receptacle outlet;
   a gas-tight shale-shaker including:
     an elongate, rectangular vibrating basket with a screen bed defining a bottom surface of the vibrating basket, an inlet end sidewall and two elongate sidewalls extending from the inlet end sidewall above and along said screen bed defining an interior volume, each of the upper ends of the inlet end sidewall and two elongate sidewalls having flanged surfaces, the vibrating basket having an open outlet end opposite the inlet end;
     a shaker inlet extending through the inlet end sidewall for introducing the slurry into the interior volume to be separated;
     a discharge chute having an open upper end spanning the width of the screen bed, the discharge chute having perimeter walls with upper flanged surfaces, the discharge chute being positioned at the open outlet end to receive separated cuttings as they are vibrated off the screen bed through the open outlet end;
     a solids outlet extending through a lower portion of the discharge chute permitting separated cuttings to exit the interior volume of the vibrating basket;
     a lower sealed section attached to the bottom of the vibrating basket enclosing a fluid collection volume for receiving drilling fluid that has passed through the screen bed;
     a drilling fluid outlet extending through the lower sealed section, permitting drilling fluid which has passed through the screen bed to exit the vibrating basket;
     a plurality of lid sections covering the interior volume and the open upper end of the discharge chute;
     a gasket being sealingly sandwiched between the plurality of lid sections and the flanged surfaces of each of the upper ends of the inlet end sidewall, the two elongate sidewalls and the upper flanged surfaces of the discharge chute perimeter walls, such that a gas-tight seal is formed between the interior volume and an environment external thereto; and a vibration mechanism operably coupled to the vibrating basket for vibrating the basket;

wherein the receptacle outlet is in fluid communication with the shaker inlet in a gas-tight manner for introducing slurry into the gas-tight shale-shaker.

2. The system of claim 1, wherein the receptacle comprises a hopper.

3. The system of claim 2, wherein the hopper is fluidically coupled to the shaker inlet in a gas-tight manner with a feed auger.

4. The system of claim 3, wherein the feed auger includes a diluent inlet.

5. The system of claim 1, wherein flexible conduits or bellows are connected to the shaker inlet and/or the solids outlet and/or a drilling fluid outlet to provide for gas-tight fluid connection and/or vibration isolation with respect to the shaker basket.

6. The system of claim 1, wherein, the gasket comprises a rubber or silicone material.

7. The system of claim 1, wherein, at least one of the plurality of lid sections is constructed of a rigid metal material, a composite material, a translucent material or shatter proof glass.

8. The system of claim 7, wherein, at least one of the plurality of lid sections is constructed of a polymer or acrylic.

9. The system of claim 1, further comprising a diluent spray bar extending through the interior volume, the diluent spray bar having one or more nozzles arranged above the screen bed and operable to spray diluent.

10. The system of claim 1, further comprising one or more of a solvent wash apparatus, vertical cuttings dryers, decanters and solid dryers as downstream gas tight processes.

* * * * *